(12) United States Patent
Hayashi et al.

(10) Patent No.: US 9,196,879 B2
(45) Date of Patent: Nov. 24, 2015

(54) BATTERY PACK

(71) Applicant: MAKITA CORPORATION, Anjo-shi, Aichi (JP)

(72) Inventors: Hidekazu Hayashi, Anjo (JP); Eiji Kondo, Anjo (JP); Hironori Ogura, Anjo (JP); Hideyuki Taga, Anjo (JP); Kazutoshi Ogino, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 13/860,208

(22) Filed: Apr. 10, 2013

(65) Prior Publication Data

US 2013/0224539 A1   Aug. 29, 2013

Related U.S. Application Data

(63) Continuation of application No. PCT/JP2011/073073, filed on Oct. 6, 2011.

(30) Foreign Application Priority Data

Nov. 4, 2010  (JP) ................................. 2010-247214
Dec. 27, 2010 (JP) ................................. 2010-290018

(51) Int. Cl.
*H01M 2/30*  (2006.01)
*H01M 2/10*  (2006.01)
*H01M 2/34*  (2006.01)
*H01M 2/36*  (2006.01)

(52) U.S. Cl.
CPC .......... *H01M 2/1016* (2013.01); *H01M 2/1022* (2013.01); *H01M 2/1055* (2013.01); *H01M 2/1094* (2013.01); *H01M 2/34* (2013.01); *H01M 2/364* (2013.01)

(58) Field of Classification Search
CPC ........................... H01M 4/131; H01M 4/1391
USPC ........................................................ 429/82
See application file for complete search history.

(56) References Cited

U.S. PATENT DOCUMENTS

2003/0082439 A1   5/2003  Sakakibara
2004/0007373 A1*  1/2004  Higuchi et al. ................. 174/50

(Continued)

FOREIGN PATENT DOCUMENTS

CN   101842933 A  *  9/2010
EP   1808914 A1      7/2007

(Continued)

OTHER PUBLICATIONS

Jul. 8, 2014 Office Action issued in Japanese Patent Application No. 2010-247214 (with translation).

(Continued)

*Primary Examiner* — Stewart Fraser
*Assistant Examiner* — Olatunji Godo
(74) *Attorney, Agent, or Firm* — Oliff PLC

(57) ABSTRACT

A battery pack may include a drainage device provided at a bottom portion of the housing case. The drainage device may include a drain hole communicating between the inside and the outside of the housing case, so that water introduced into the housing case is discharged to the outside of the housing case. The drainage device may be disposed between two of the terminal members that are connected to electrodes of the battery cells.

16 Claims, 18 Drawing Sheets

(56) References Cited

U.S. PATENT DOCUMENTS

| | | | |
|---|---|---|---|
| 2006/0268504 A1* | 11/2006 | Shimizu et al. | 361/683 |
| 2007/0236177 A1* | 10/2007 | Phillips et al. | 320/115 |
| 2010/0151301 A1* | 6/2010 | Paik et al. | 429/94 |
| 2010/0255359 A1* | 10/2010 | Hirakawa et al. | 429/120 |

FOREIGN PATENT DOCUMENTS

| | | |
|---|---|---|
| EP | 2421067 A1 | 2/2012 |
| JP | U-60-48668 | 4/1985 |
| JP | H11-233083 A | 8/1999 |
| JP | A-2003-142051 | 5/2003 |
| JP | A-2005-174758 | 6/2005 |
| JP | A-2006-156171 | 6/2006 |
| JP | A-2006-196277 | 7/2006 |

OTHER PUBLICATIONS

International Search Report issued in International Patent Application PCT/JP2011/073073 dated Dec. 27, 2011.
Jun. 1, 2015 Search Report issued in European Application No. 11837830.6.

* cited by examiner

BATTERY PACK

TECHNICAL FIELD

Embodiments of the present invention relates to a battery pack configured to be capable of being mounted to a tool body of an electric tool as a power source of the electric tool.

BACKGROUND ART

In the related art, an electric tool includes a tool body driven by electric power, and a battery pack that serves as a power source for the tool body. The battery pack is configured to be detachably mounted to the tool body. The battery pack includes a housing case that forms an exterior cover, and a battery body that is installed in the housing case. The battery body includes a plurality of battery cells that can be charged and discharged, and a control board that controls the charge and discharge operations. Lead plates are connected to electrodes of the plurality of battery cells so that the battery cells are electrically connected in series or in parallel to each other.

Meanwhile, there may be an occasion that the afore-mentioned electric tool is used outdoors. Therefore, water such as raindrops may be splashed on such a battery pack, so that water may enter into the housing case. Here, when water enters into the housing case to cause the above-mentioned lead plates to be soaked in the water, unintended lead plates may be electrically connected to each other to the result that electricity, which is charged in battery cells, leaks.

For this reason, among battery packs, a battery pack has been known that is provided with a drain hole at a bottom portion of a housing case in order to discharge the water, which has been entered into the housing case, to the outside of the housing case (for example, see JP-A-2006-196277). According to this battery pack, it is possible to drain the water, which has been entered into the housing case, to the outside of the housing case from the drain hole, and therefore, it is possible to avoid the soaking of the lead plates in water, so that electricity charged in the battery cells may not leak.

Incidentally, in order to improve the drainage effect described above, it has been considered to provide a plurality of the drain holes formed at the bottom portion of the housing case.

However, if the plurality of drain holes are merely formed at the bottom portion of the housing case, conversely, water or dust may easily enter into the housing case from the drain holes. For this reason, it is preferable that the number of the drain holes is as small as possible, while the drainage effect described above is enhanced.

It is an object of the invention to provide a battery pack that is configured to be capable of being mounted on a tool body of an electric tool as a power source of the electric tool, can efficiently drain water having been introduced into a housing case to the outside of the housing case so as to prevent the leakage of the electricity charged in battery cells, and can make the number of drain holes be as small as possible.

SUMMARY OF THE INVENTION

In one aspect according to the present teachings, a battery pack may include a drainage device provided at a bottom portion of the housing case. The drainage device may include a drain hole communicating between inside and outside of the housing case, so that water introduced into the housing case is discharged to the outside of the housing case. The drainage device may be disposed at least between two of terminal members that are connected to electrodes of the battery cells.

According to a first embodiment, there is provided a battery pack configured to be able to be mounted on a tool body of an electric tool as a power source of the electric tool. The battery pack has a housing case forming an outer cover and a plurality of battery cells disposed in the housing case. A drainage function-shape portion is provided at a bottom portion of the housing case and includes a drain hole communicating with the inside of the housing case and the outside of the housing case for discharging water. which has been introduced into the housing case, to the outside of the housing case. An arrangement position of the drainage function-shape portion is set to be present at least between terminal members connected to electrodes of the battery cells.

Here, the drainage function-shape portion may include a drain hole communicating between the inside of the housing case and the outside of the housing case. This means that the drainage function-shape portion may be formed of only the drain hole or may include the drain hole and a structure that guides water to the drain hole.

According to the battery pack of the first embodiment, since the arrangement position of the drainage function-shape portion, which is disposed at the bottom portion of the housing case, is set to be present at least between the terminal members connected to the electrodes of the battery cells, it is possible to discharge water, which is present between the terminal members, to the outside of the housing case from the inside of the housing case. Accordingly, it is possible to drain water so that water presented at least between the terminal members is removed. As a result, it is possible to prevent the electrical connection between the terminal members, which may be caused when the terminal members soak in water. That is, even in the case that an appropriate rib shape is formed in the housing case for supporting the battery cells, it is possible to prevent electrical connection, which may be caused when at least the terminal members soak in the water, while allowing a puddle to be formed by the rib shape.

Accordingly, it is possible to prevent unintended electrical connection between the terminal members, which may be caused when the terminal members become soaked in water. That is, it is possible to efficiently drain water, which has been introduced into the housing case, to the outside of the housing case so that leakage of the electricity charged in the battery cells is prevented. Further, since the drain holes to be arranged are suppressed to minimal positions where the unintended electrical connection between the terminal members can be prevented, it is possible to make the number of drain holes be as small as possible.

According to a second embodiment, in the battery pack according to the first aspect, the terminal members, between which the arrangement position of the drainage function-shape portion is set, are terminal members that have a mutually adjacent arrangement relationship along an adjacently arranged direction of the electrodes of the plurality of battery cells. The battery cells are arranged in parallel so that the electrodes are arranged adjacent to each other, and have electrical potentials different from each other.

With the battery pack of the second embodiment, the terminal members, between which the arrangement position of the drainage function-shape portion is set, are terminal members which have a mutually adjacent arrangement relationship and have electrical potentials different from each other. Accordingly, a position where water is to be drained, can be set to be between the terminal members having a mutually adjacent arrangement relationship and have electrical potentials different from each other. Therefore, it is possible to set a position where it is desirous to drain and remove water for maintaining an insulation state, to a position where a short circuit between the terminal members is apt to occur, so that it is possible to more reliably prevent a short circuit, which may be caused when the terminal members soak in water.

According to a third embodiment, in the battery pack according to the first or second embodiment, an outer end edge of the drain hole disposed on an outer side of the housing case is formed and set to have a shape so that the outer end edge rises toward the inside of the housing case as compared to at least a peripheral portion of the outer end edge.

With the battery pack of the third embodiment, the outer end edge of the drain hole disposed on an outer side of the housing case is formed and set to have a shape so that the outer end edge rises toward the inside of the housing case as compared to at least the peripheral portion of the outer end edge. Accordingly, even in the case that the battery pack mounted on the tool body is placed on a desk or the ground and the bottom portion of the battery pack comes into contact with a placement surface of the desk or the ground, the outer end edge of the drain hole is positioned above the placement surface. Therefore, since it is possible to prevent the drain hole from being closed by the placement surface, it is possible to discharge the water, which is introduced into the housing case, to the outside of the housing case from the drain hole.

In addition, since it is possible to form at least a small clearance between the outer end edge of the drain hole and the placement surface, it is possible to easily guide the water, which is present in the housing case, to the outside of the housing case by utilizing the surface tension of the water introduced into the clearance. Accordingly, it is possible to efficiently drain the water, which has been introduced into the housing case, to the outside of the housing case.

According to a fourth embodiment, in the battery pack according to any one of the first to third embodiments, the drainage function-shape portion includes a flow guide device for guiding the flow of water so that water flows toward the drain hole, and the flow guide device is formed as a drain passage, so that the bottom portion of an inner side of the housing case is inclined downward toward the lower side of the bottom portion along a direction toward the drain hole.

With the battery pack of the fourth embodiment, since the flow guide device is formed as a drain passage, so that the bottom portion of an inner side of the housing case is inclined downward toward the lower side of the bottom portion along a direction toward the drain hole, it is possible to make the water, which has been introduced into the housing case, flow toward the drain hole by the inclined structure of the drain passage. Accordingly, it is possible to improve the drainage performance of not only the periphery of the drain hole but also a portion forming the drain passage, so that it is possible to expand a range, for which it is desired to improved the drainage performance.

Meanwhile, the arrangement portion where the drain passage is arranged may be present between the terminal members that are connected to the electrodes of the battery cells, or may be present at a position other than the position between the terminal members. Further, the drain passage may be formed to be inclined relative to the inner surface of the bottom portion, and may be formed flush with the outer surface of the bottom portion.

According to a fifth embodiment, in the battery pack according to any one of the first to fourth embodiments, the drainage function-shape portion includes a draw guide device for guiding the draw of water so that water is collected toward the drain hole, and the draw guide device is formed as a drawing groove that extends in a concave groove shape along an inner surface of the housing case from an inner end edge of the drain hole disposed on an inner side of the housing case, and acts so as to draw water toward the drain hole.

With the battery pack of the fifth embodiment, the draw guide device is formed as a drawing groove that extends in a concave groove shape along an inner surface of the housing case from an inner end edge of the drain hole disposed on an inner side of the housing case, and acts so as to draw water toward the drain hole.

Accordingly, it is possible to make the complete drainage of the water, which is present between the terminal members, so as to affect to the peripheral portion of the drain hole. Therefore, it is possible to more reliably prevent the electrical connection between the terminal members, which may be caused when the terminal members are soaked in water.

According to a sixth embodiment, in the battery pack according to any one of the first to fifth embodiments, a foreign material-introduction restricting rib is provided in the housing case so as to cross an opening shape of the drain hole in the housing case while maintaining an opened state of the drain hole.

With the battery pack of the sixth embodiment, the foreign material-introduction restricting rib is provided in the housing case so as to cross an opening shape of the drain hole in the housing case. Accordingly, even in the case that foreign materials are likely introduced into the housing case from the outside of the housing case through the drain hole, it is possible to hinder the introduction of the foreign materials by the foreign material-introduction regulating rib. Therefore, it is possible to maintain a clean inside of the housing case.

According to a seventh embodiment, in the battery pack according to any one of the first to sixth embodiments, an arrangement position of the drain hole is set to be present between the terminal members, and an arrangement position of any one or both of the flow guide device and the draw guide device is set to a position that is different from the position set between the terminal members. According to the battery pack of the seventh aspect, since the arrangement position of the drain hole is set to be present between the terminal members, it is possible to drain the water, which is present between the terminal members, to the outside of the housing case from the inside of the housing case. Accordingly, it is possible to guide the water, which is present in the vicinity of the drain hole, to the drain hole by the flow guide device or the draw guide device and to completely remove the water, which is present between these terminal members, by the presence of the drain hole. Therefore, it is possible to reliably prevent the unintended electrical connection between the terminal members.

According to an eighth embodiment, in the battery pack according to any one of the first to sixth embodiments, at least a part of any one or both of the flow guide device and the draw guide device is set to be present between the terminal members, and an arrangement position of the drain hole is set to a position that is different from the position set between the terminal members.

With the battery pack of the eighth embodiment, the arrangement position of the drain hole is set to a position that is different from the position set between the terminal members, and at least a part of any one or both of the flow guide device and the draw guide device is set to be present between the terminal members. Accordingly, the arrangement position of the drain hole can be set to a suitable portion of the housing case according to the design of the battery pack, while it is possible to drain water, which is present between these terminal members, to the outside of the housing case from the inside of the housing case. Therefore, it is possible to increase the degree of freedom of the arrangement position of the drain hole, so that it is also possible to increase the degree of freedom in the design of the battery pack.

Further, according to a ninth embodiment, in the battery pack according to the first embodiment, the housing case forming the outer cover of the battery pack is provided with a communication opening that communicates with the inside of the housing case from the outside of the housing case, and the housing case is provided with a water-introduction restricting portion that restricts the introduction of water, which is present in the vicinity of the communication opening, into the communication opening.

With the battery pack of the ninth embodiment, the housing case is provided with a water-introduction restricting portion that restricts the introduction of the water, which is present in the vicinity of the communication opening, into the communication opening, and therefore, the water-introduction regulating portion can restrict the introduction of water into the communication opening. Accordingly, it is possible to improve the waterproof property of the battery pack by restricting the intrusion of water into the housing case from the outside of the housing case.

According to a tenth embodiment, in the battery pack according to the ninth aspect, the water-introduction restricting portion is configured to have an inclined structure that makes water, which is present in the vicinity of the communication opening, flow in a direction away from the communication opening.

With the battery pack of the tenth embodiment, since the water-introduction restricting portion is configured to have an inclined structure that makes water, which is present in the vicinity of the communication opening, flow in a direction away from the communication opening, it is possible to make the water, which is present in the vicinity of the communication opening, flow in the direction away from the communication opening by the inclined structure of the water-introduction restricting portion. Accordingly, it is possible to restrict the introduction of water into the housing case from the outside of the housing case by isolating water from the communication opening, so that it is possible to improve the waterproof property of the battery pack.

According to an eleventh embodiment, in the battery pack according to the tenth embodiment, a battery-side connection terminal that is electrically connected to a connection terminal provided on a mounting target when the battery pack is mounted on the mounting target such as the tool body, wherein the communication opening is positioned at an arrangement portion where the battery-side connection terminal is arranged, and the water-introduction restricting portion is set for the periphery of the arrangement portion of the battery-side connection terminal, which is set to be the vicinity of the communication opening. The mounting target may be, for example, a tool body that is driven by the electric power, or a dedicated charger that is used during charging.

With the battery pack of the eleventh embodiment, since the water-introduction restriction portion is set for the periphery of the arrangement portion of the battery-side connection terminal, it is possible to make the water, which is present in the vicinity of the arrangement portion of the battery-side connection terminal, flow in the direction away from the periphery of the arrangement portion of the battery-side connection terminal using the inclined structure of the water-introduction restricting portion. Accordingly, it is possible to separate water from the arrangement portion of the battery-side connection terminal, and therefore, it is possible to improve the waterproof property of the battery pack by restricting the intrusion of water into the housing case from the outside of the housing case, so that it is possible to make the contact between water such as raindrops and the battery-side connection terminal more difficult.

According to a twelfth embodiment, the water-introduction restricting portion is formed in an uneven shape that isolates the water, which is present in the vicinity of the communication opening, from the communication opening.

With the battery pack of the twelfth embodiment, since the water-introduction restricting portion is formed in an uneven shape that isolates the water, which is present in the vicinity of the communication opening, from the communication opening, it is possible to isolate water, which is present in the vicinity of the communication opening, from the communication opening by the uneven shape of the water-introduction restricting portion. Accordingly, it is possible to restrict the intrusion of water into the housing case from the outside of the housing case by isolating water from the communication opening, so that it is possible to improve the waterproof property of the battery pack.

Here, the "uneven shape" may include, for example, a convex wall structure having ribs in the shape of a protrusion, a concave groove, or any appropriate uneven step shape, or the like. It may also include any of a concave shape, a convex shape, and an uneven shape that function to isolate the water, which is present in the vicinity of the communication opening, from the communication opening.

In a thirteenth embodiment, constructed similar to a battery pack of the twelfth embodiment, a male hook portion is fitted to a female hook portion provided on a mounting target when the battery pack is mounted on a mounting target such as the tool body. The communication opening is set to an arrangement portion where the male hook portion is arranged, and the water-introduction restricting portion is provided as the periphery of the arrangement portion of the male hook portion. Such water-introduction restricting portion is set to be the vicinity of the communication opening.

With the battery pack of the thirteenth embodiment, since the water-introduction restricting portion is provided for on the periphery of the arrangement portion of the male hook portion, it is possible to isolate the water, which is present in the periphery of the arrangement portion of the male hook portion, from the arrangement portion of the male hook portion, by the uneven shape of the water-introduction restricting portion. Accordingly, it is possible to restrict the introduction of water into the housing case from the outside of the housing case by isolating water from the arrangement portion of the male hook portion, so that it is possible to improve the waterproof property of the battery pack.

According to a fourteenth embodiment, in the battery pack according to the twelfth embodiment, there is provided a vent hole through which air flows into the housing case from the outside of the housing case, wherein the communication opening is set to an arrangement portion where the vent hole is arranged. The water-introduction restricting portion is provided on the periphery of the arrangement portion of the vent hole, which is set to be the periphery of the communication opening.

With the battery pack of the fourteenth embodiment, since the water-introduction restricting portion is provided on the periphery of the arrangement portion of the vent hole, it is possible to isolate the water, which is present in the periphery of the arrangement portion of the vent hole, from the arrangement portion of the vent hole by the uneven shape of the water-introduction restricting portion. Accordingly, it is possible to restrict the introduction of water into the housing case from the outside of the housing case by isolating water from the arrangement portion of the vent hole portion, so that it is possible to improve the waterproof property of the battery pack.

Advantageous Effects of Embodiments

According to the battery pack of the first embodiment, it is possible to efficiently drain water, which has been introduced into the housing case, to the outside of the housing case so as to prevent the leakage of the electricity charged in battery cells, and to make the number of drain holes be as small as possible.

According to the battery pack of the second embodiment, it is possible to set a position, for which it is desirous to maintain an insulation state, to a position where a short circuit between the terminal members easily occurs, and therefore, it is possible to more reliably prevent a short circuit.

According to the battery pack of the third embodiment, it is possible to prevent the drain hole from being closed by the placement surface, and therefore, it is possible to easily guide the water, which is present in the housing case, to the outside of the housing case.

According to the battery pack of the fourth embodiment, it is possible to improve the drainage performance of not only the periphery of the drain hole but also a portion forming the drain passage, so that it is possible to expand a range, for which it is desired to improved the drainage performance.

According to the battery pack of the fifth embodiment, it is possible to more reliably prevent the electrical connection between the terminal members, which may be caused when the terminal members soak in water.

According to the battery pack of the sixth embodiment, it is possible to maintain the inside of the housing case clean.

According to the battery pack of the seventh embodiment, it is possible to completely remove water, which is present between the terminal members, by the presence of the drain hole, so that it is possible to reliably prevent the unintended electrical connection between the terminal members.

According to the battery pack of the eighth embodiment, it is possible to increase the degree of freedom of the arrangement position of the drain hole, so that it is also possible to increase the degree of freedom in the design of the battery pack.

According to the battery pack of the ninth embodiment, it is possible to restrict the introduction of water into the housing case from the outside of the housing case, so that it is possible to improve the waterproof property of the battery pack.

According to the battery pack of the tenth embodiment, it is possible to restrict the introduction of water by isolating water from the communication opening, so that it is possible to improve the waterproof property of the battery pack.

According to the battery pack of the eleventh embodiment, it is possible to improve the waterproof property of the battery pack, so that it is possible to make the contact between water such as raindrops and the battery-side connection terminal more difficult.

According to the battery pack of the twelfth embodiment, the introduction of water into the housing case from the outside of the housing case is restricted by isolating water from the communication opening. Accordingly, the waterproof property of the battery pack is improved.

According to the battery pack of the thirteenth embodiment, the introduction of water is restricted by isolating water from the arrangement portion of the male hook portion. Accordingly, the waterproof property of the battery pack is improved.

According to the battery pack of the fourteenth embodiment, the introduction of water is restricted by isolating water from the arrangement portion of the vent hole. Accordingly, the waterproof property of the battery pack is improved.

DETAILED DESCRIPTION OF THE INVENTION

First and second embodiments, which are embodied in a first example shown in FIGS. 1 to 12, will be described below.

First Embodiment

The first embodiment, which embodies a battery pack according to the invention, will be described below with reference to FIGS. 1 to 10.

Figure 1:
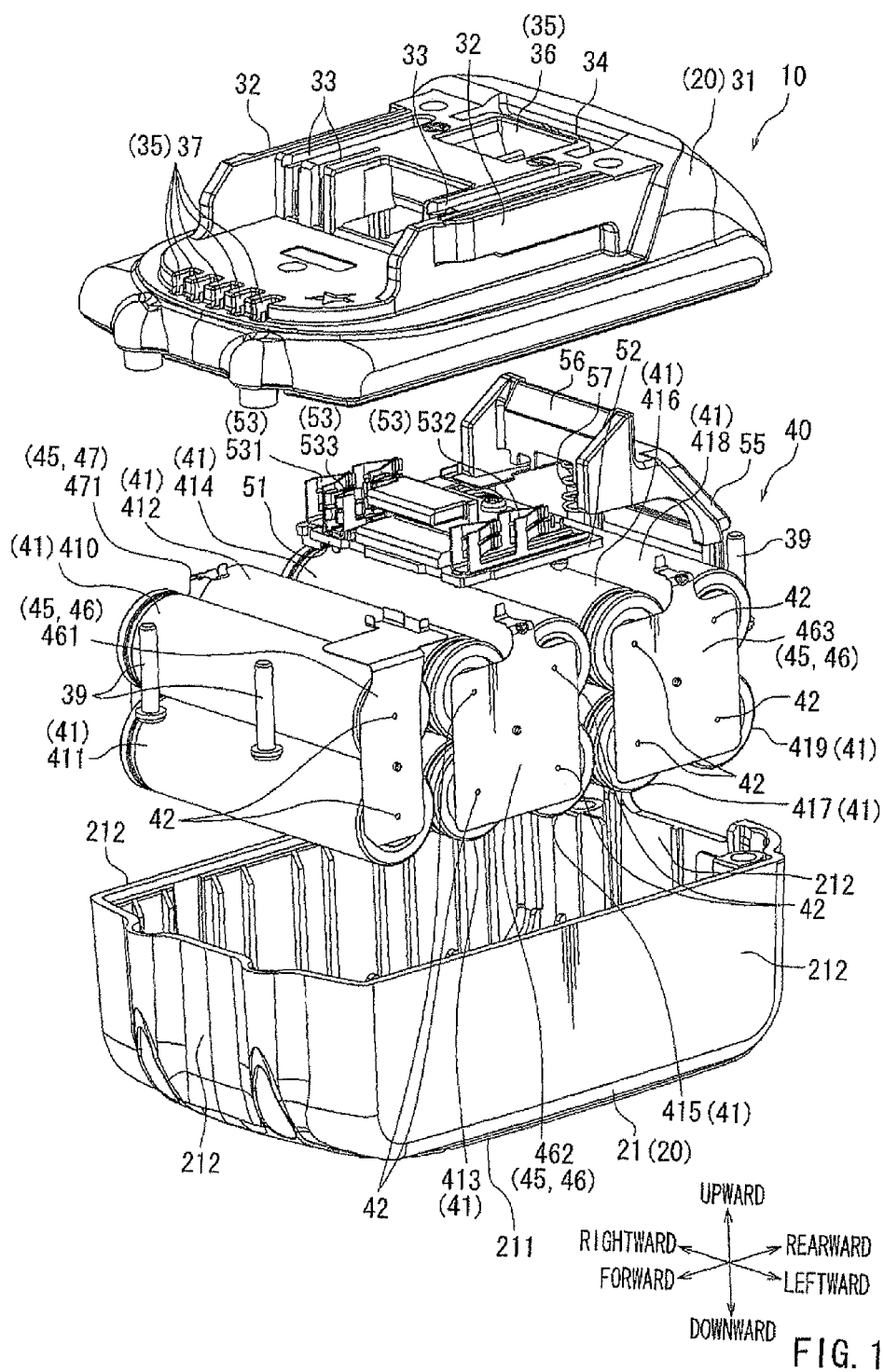
FIG. 1 is an exploded perspective view of a battery pack of a first embodiment that is embodied in a first example.

An exploded perspective view of FIG. 1 shows a battery pack 10 of a first embodiment that is embodied in a first example. This exploded perspective view shows the battery pack 10 so that the inside of a battery pack body 40 is seen. Meanwhile, in the following description, an electrical connection side of the battery pack 10 will be defined as the upper side and a slide mounting direction of the battery pack 10 will be defined as a forward direction.

The battery pack 10 is configured to be detachably mounted by sliding onto a tool body (mounting target) of an electric tool that is typified by, for example, an electric screwdriver. The battery pack 10 serves as a drive power source of the tool body having on the battery pack 10 mounted thereon. For this reason, when the charge amount of the battery pack 10 is reduced, the battery pack 10 is removed from the tool body and charged by a dedicated external charger (mounting target), and when it is completely charged by the dedicated charger, the battery pack 10 is remounted on the tool body and functions as a drive power source.

As shown in the exploded perspective view of FIG. 1, the battery pack 10 generally includes a housing case 20 and a battery pack body 40. The housing case 20 is formed in the shape of a case in which the battery pack body 40 is disposed and which forms an outer cover. Further, the battery pack body 40 is mounted within the housing case 20.

Prior to the description of the housing case 20, the structure of the battery pack body 40 will be described.

The battery pack body 40 is disposed in the housing case 20 described in detail below and generally includes a plurality of battery cells 41, a connection control board 51, and a male hook mechanism 55 as shown in FIG. 1.

The battery cells 41 are battery cells that are broadly used and can be charged and discharged. As shown in FIG. 1, the battery cells 41 of the battery pack body 40 are disposed in parallel so that a total of ten battery cells 41 form two stages each of which includes five battery cells and electrodes 42 of the battery cells 41 are adjacent to each other. Specifically, a total of ten battery cells 41 are arranged side by side to form two stages each having five battery cells, so that the electrodes 42 of the battery cells 41 are positioned on both the left and right sides of the battery pack. Meanwhile, for the purpose of explanation of the battery cells 41 arranged side by side in this way, the battery cells 41 are denoted by reference numerals as a first battery cell 410, a second battery cell 411, a third battery cell 412, a fourth battery cell 413, . . . in this order from the upper side and the front side of the battery pack 10. Further, a lead base end of a lead wire of the electrode 42 of each battery cell 41, which is shown in the drawing, is shown as a circular mark in a lead plate 45. However, this lead wire is led from an end portion of the battery cell 41 that is positioned at the circular mark of the lead plate 45.

The electrodes 42 of the battery cells 41, which have been arranged side by side as described above, are positioned at both left and right ends of the battery pack 10. That is, ten electrodes 42 of the respective battery cells 41 are positioned at each of both left and right ends of the battery pack 10. Lead plates 45, which are to be electrically connected, are mounted on the respective electrodes 42 of these battery cells 41. Specifically, left lead plates 46, which are electrically connected, are mounted on the electrodes 42, which are positioned at the left ends, of the ten battery cells 41; right lead plates 47, which are electrically connected, are mounted on the electrodes 42, which are positioned at the right ends, of the ten battery cells 41. These left and right lead plates 46 and 47 correspond to terminal members according to the invention, and function as plate-like terminals that are broadly used. Moreover, the other sides of the lead plates 45 (the left and right lead plates 46 and 47) of which one sides are connected to the electrodes 42 of the battery cells 41 in this way are electrically connected to the connection control board 51 that will be described below. Meanwhile, these left and right lead plates 46 and 47 will be described in detail later.

Next, the connection control board 51 and the male hook mechanism 55 will be described.

The connection control board 51 is electrically connected to the battery cells 41 that can be charged and discharged, and controls the charge and discharge of the battery cells 41. That is, the connection control board 51 is disposed above the above-mentioned plurality of battery cells 41, and generally includes a control board 52 and connection terminal portions 53 that are provided on the control board 52. The control board 52 performs appropriate electrical controls when the battery cells 41 are charged and discharged. The connection terminal portions 53 serve as terminals that are electrically connected to a tool body or a dedicated charger (not shown) serving as a mounting target. That is, the connection terminal portions 53 include three kinds of connection terminals, that is, a positive connection terminal 531 that is connected to a positive terminal of, for example, the tool body serving as the mounting target; a negative connection terminal 532 that is connected to a negative terminal of, for example, the tool body; and a control connection terminal 533 that is connected to a control terminal of, for example, the tool body. Meanwhile, these connection terminal portions 53 are formed by leaf spring-type metal terminals that are disposed so as to face each other.

The male hook mechanism 55 has the structure that is removably locked to the tool body when sliding to be mounted on, for example, the tool body serving as the above-mentioned mounting target. For this reason, the male hook mechanism 55 has a hook shape for locking to the tool body and a finger-engaging shape for a release operation. Specifically, the male hook mechanism 55 includes a hook-type structure 56 that has the hook shape and the finger-engaging shape and a biasing spring 57 that biases the hook-type structure 56 in a locking direction. The male hook mechanism 55 having the above-mentioned structure automatically locks the hook-type structure 56 to the tool body by a biasing force of the biasing spring 57 when slid to be mounted on the tool body. Further, when a release operation is performed against the biasing force of the biasing spring 57, the locking of the hook-type structure 56 to the tool body is released. When the battery pack 10 is slid in this state, the male hook mechanism 55 can be removed from the tool body.

Next, the above-mentioned left and right lead plates 46 and 47 will be described in detail.

The left and right lead plates 46 and 47 are formed of plate-like terminals, respectively, and are mounted over the electrodes 42 of the plurality of battery cells 41, respectively.

Figure 2:
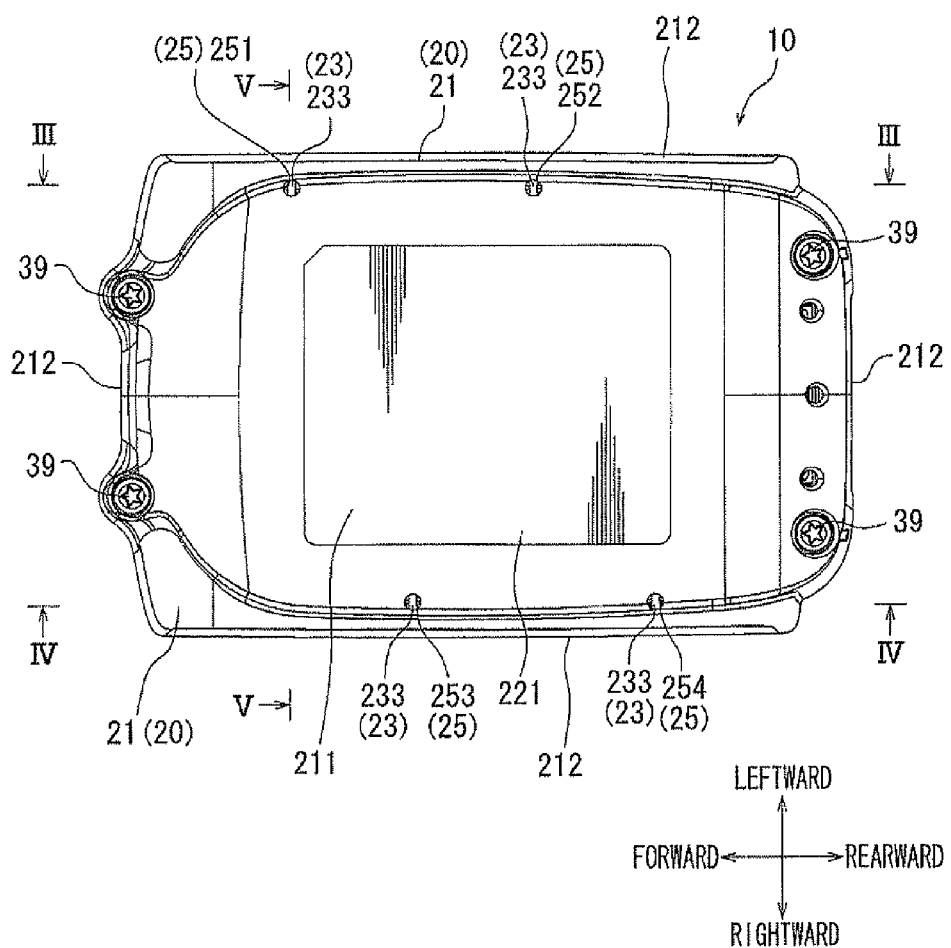
FIG. 2 is a bottom view of the battery pack of FIG. 1 when seen from the bottom.
Figure 3:
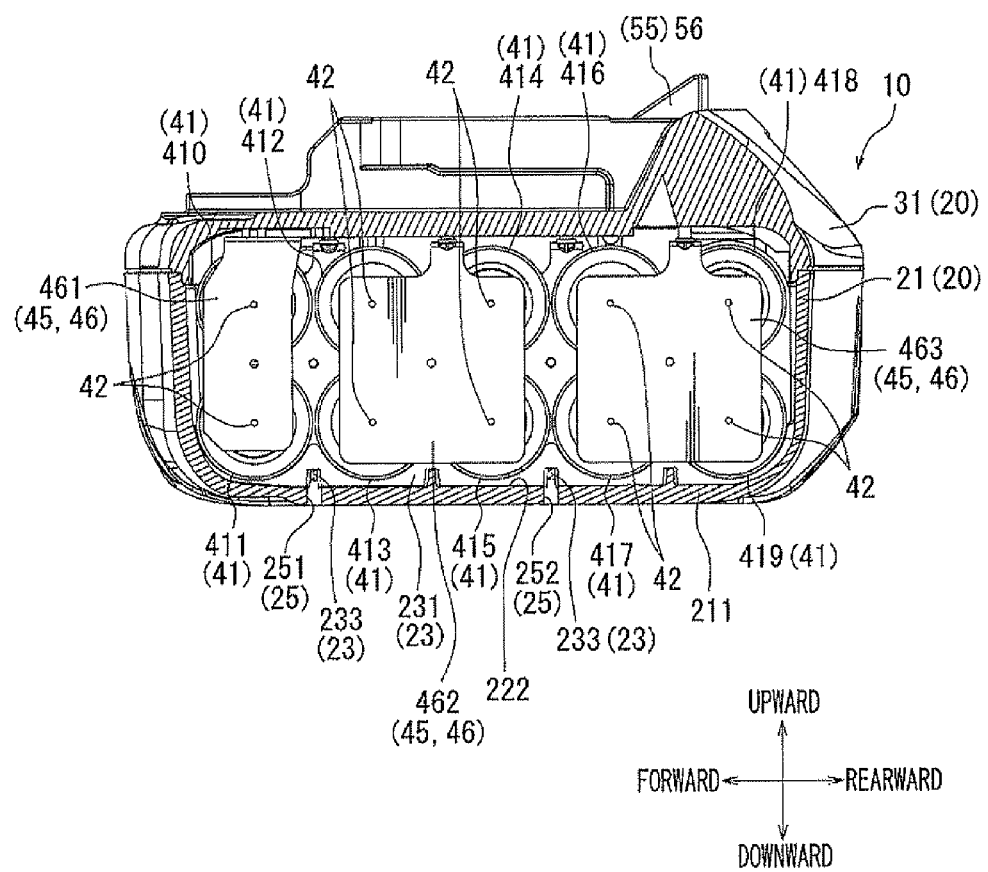
FIG. 3 is a cross-sectional view of the battery pack taken along line in FIG. 2.

A bottom view of FIG. 2 shows the battery pack 10 that is seen from the bottom. A cross-sectional view of FIG. 3 shows the cross-section of the battery pack 10 of FIG. 2 taken along line so that the left lead plates 46 positioned on the left side of the battery pack 10 are seen. A cross-sectional view of FIG. 4 shows the cross-section of the battery pack 10 of FIG. 2 taken along line IV-IV so that the right lead plates 47 positioned on the right side of the battery pack 10 are seen.

As shown in FIG. 3, the left lead plates 46 are formed of three plate-like terminals that are separated from each other. The three left lead plates 46 are denoted by reference numerals as a first left lead plate 461, a second left lead plate 462, and a third left lead plate 463 in this order from the front side. That is, as shown in FIG. 3, the first left lead plate 461 is mounted to extend between the two left electrodes 42 of the first battery cell 410 and the second battery cell 411 among ten electrodes 42 that are formed at the left ends of the battery cells 41. Further, the second left lead plate 462 is mounted to extend between the four left electrodes 42 of the third battery cell 412, the fourth battery cell 413, the fifth battery cell 414, and the sixth battery cell 415. Furthermore, the third left lead plate 463 is mounted to extend between the four left electrodes 42 of the seventh battery cell 416, the eighth battery cell 417, the ninth battery cell 418, and the tenth battery cell 419.

Meanwhile, conversely, as shown in FIG. 3, the first and second left lead plates 461 and 462 are arranged and constructed to form a separate configuration such that the first and second battery cells 410 and 411 and the third and fourth battery cells 412 and 413 are not electrically connected to each other so as to be divided and separated from each other. According to the arrangement relationship between these left lead plates, the first and second left lead plates 461 and 462 adjacent to each other serve as the lead plates 45 of which the electrical potentials are different from each other. Further, the second and third left lead plates 462 and 463 are arranged and constructed to form a separate configuration such that the fifth and sixth battery cells 414 and 415 and the seventh and eighth battery cells 416 and 417 are not electrically connected to each other so as to be divided and separated from each other. According to the arrangement relationship between these left lead plates, the second and third left lead plates 462 and 463 adjacent to each other serve as the lead plates 45 of which the electrical potentials are different from each other. That is, individually, the left lead plates 46 (461, 462, and 463) are arranged adjacent to each other along the direction where the electrodes 42 of the ten battery cells 41 disposed in parallel are adjacent to each other, and the electrical potentials of the left lead plates 46 are different from each other.

Figure 4:
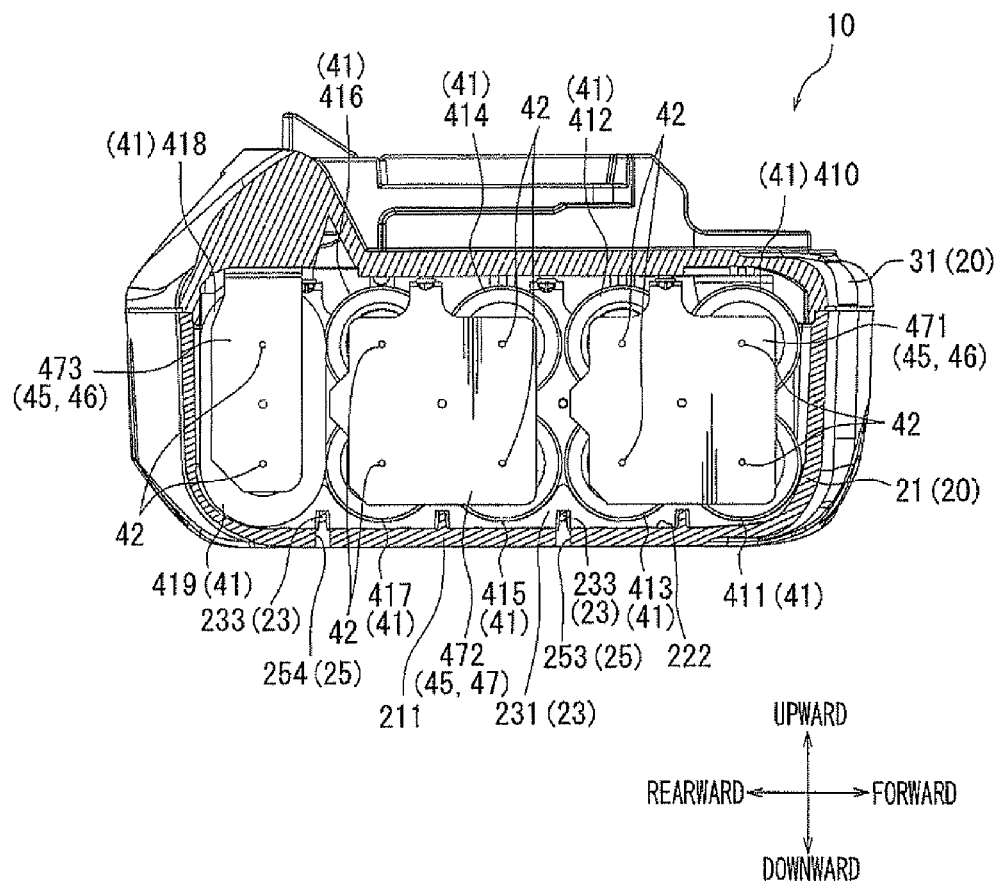
FIG. 4 is a cross-sectional view of the battery pack taken along line IV-IV in FIG. 2.

Moreover, as shown in FIG. 4, the right lead plates 47 are also formed of three plate-like terminals that are separated from each other. The three right lead plates 47 are denoted by reference numerals as a first right lead plate 471, a second right lead plate 472, and a third right lead plate 473 in this order from the front side. That is, as shown in FIG. 4, the first right lead plate 471 is mounted to extend between the four right electrodes 42 of the first battery cell 410, the second battery cell 411, the third battery cell 412, and the fourth battery cell 413 among ten electrodes 42 that are formed at the right ends of the battery cells 41. Further, the second right lead plate 472 is mounted to extend between the four right electrodes 42 of the fifth battery cell 414, the sixth battery cell 415, the seventh battery cell 416, and the eighth battery cell 417. Furthermore, the third right lead plate 473 is mounted to extend between the two right electrodes 42 of the ninth battery cell 418 and the tenth battery cell 419.

Meanwhile, conversely, as shown in FIG. 4, the first and second right lead plates 471 and 472 are arranged and constructed to form a separate configuration such that the third and fourth battery cells 412 and 413 and the fifth and sixth battery cells 414 and 415 are not electrically connected to each other so as to be divided and separated from each other. According to the arrangement relationship between these right lead plates, the first and second right lead plates 471 and 472 adjacent to each other are formed of the lead plates 45 of which the electrical potentials are different from each other. Further, the second and third right lead plates 472 and 473 are arranged and constructed to form a separate configuration such that the seventh and eighth battery cells 416 and 417 and the ninth and tenth battery cells 418 and 419 are not electrically connected to each other so as to be divided and separated from each other. According to the arrangement relationship between these right lead plates, the second and third right lead plates 472 and 473 adjacent to each other are formed of the lead plates 45 of which the electrical potentials are different from each other. That is, individually, the right lead plates 47 (471, 472, and 473) are also arranged adjacent to each other along the direction where the electrodes 42 of the ten battery cells 41 disposed in parallel are adjacent to each other, and the electrical potentials of the right lead plates 47 are different from each other.

Next, the housing case 20 in which the above-mentioned battery pack body 40 is disposed will be described.

The housing case 20 has a function as an outer cover case of the battery pack 10 and also has a function as a housing in which the battery pack body 40 is disposed. The housing case 20 includes a box-shaped case body 21 with an opened upper portion, and an upper cover member 31 that closes the opened upper portion of the case body 21 as an upper cover of the case body 21. The case body 21 and the upper cover member 31 are fastened to each other by screw members 39.

First, the upper cover member 31 of the housing case 20 will be described.

The upper cover member 31 serves as a connection-side outer cover of the housing case 20 when the battery pack 10 is slid to be mounted. That is, the upper cover member 31 is formed to have a structure capable of sliding to be mounted on the mounting target such as the tool body. Specifically, slide guide portions 32, which guide the slide mounting, are formed at the middle portion of the upper cover member 31. Further, the upper cover member 31 is provided with connection openings 33 that allow the terminals of the mounting target to be connected to the above-mentioned connection terminal portions 53 (the connection control board 51). The upper cover member 31 is provided with a hook-exposure opening 34 through which the hook-type structure 56 (the male hook mechanism 55) to be locked to the mounting target is exposed to the outside. The upper cover member 31 is provided with an air vent opening 35 through which air is sent to cool the inside of the housing case 20. The air vent opening 35 includes a first air vent opening 36 through which cooling air is sent into the housing case 20 and second air vent openings 37 through which the cooling air sent into the housing case 20 is discharged to the outside of the housing case 20 after cooling the battery cells 41. Meanwhile, the slide guide portions 32, the connection openings 33, and the like are formed to have shapes that cope with the slide mounting of the battery pack 10.

Next, the case body 21 of the housing case 20 will be described.

Figure 5:
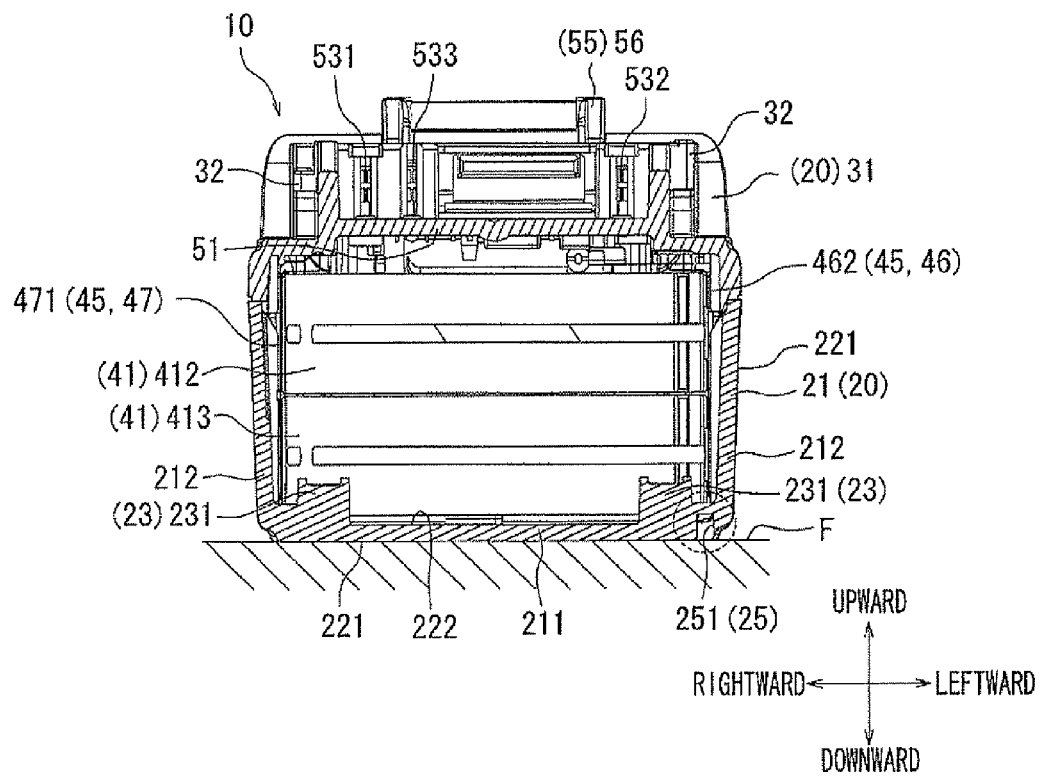
FIG. 5 is a cross-sectional view of the battery pack taken along line V-V in FIG. 2.
Figure 6:
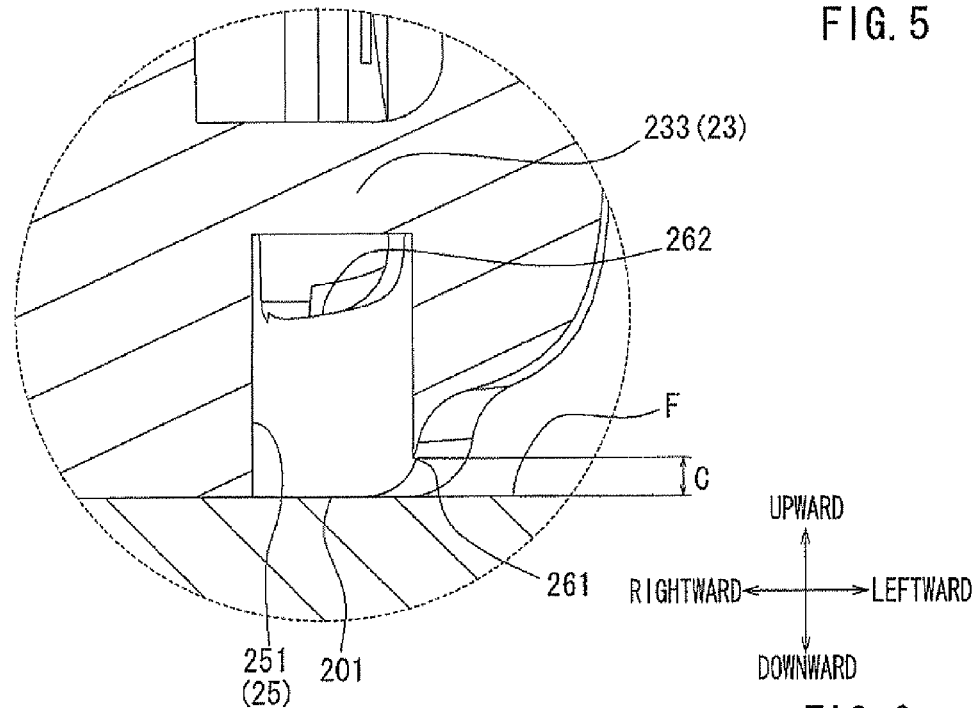
FIG. 6 is an enlarged cross-sectional view of an arrangement portion of a case body of FIG. 5 where a drain hole is arranged.
Figure 7:
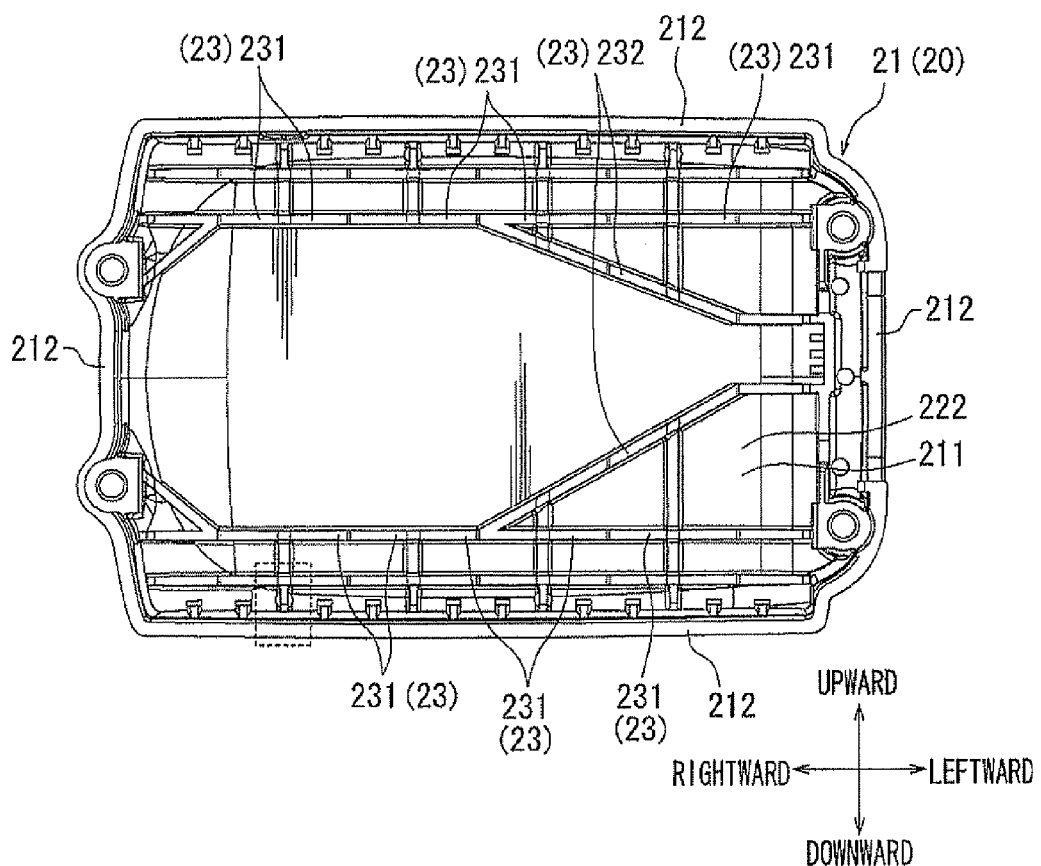
FIG. 7 is a top view of the ease body that is seen from the top so that the inside of the case body is seen.

A cross-sectional view of FIG. 5 shows the cross-section of the battery pack 10 of FIG. 2 taken along line V-V. A cross-sectional view of FIG. 6 is an enlarged cross-sectional view of a portion (a portion that is marked with a circle shown in FIG. 5 by a chain line) of the case body 21 of FIG. 5 where a drain hole 25 is disposed. A top view of FIG. 7 shows the case body 21 that is seen from the top so that the inside of the case body 21 is seen. A top view of FIG. 8 enlarges and shows the portion (the portion that is marked with a circle shown in FIG. 5 by a chain line) of the case body 21 of FIG. 7 where the drain hole 25 is disposed. Meanwhile, in FIGS. 5 and 6, the battery pack 10 is placed on a placement surface F that forms a horizontal surface.

As also shown in FIG. 1, the case body 21 is formed in the shape of a box which is surrounded by one bottom wall portion 211 and four side wall portions 212 and of which the upper portion is opened so that the above-mentioned battery pack body 40 can be installed. Meanwhile, the bottom wall portion 211 of the case body 21 corresponds to a bottom portion according to the invention. As shown in FIG. 5, the case body 21 is formed so that the above-mentioned battery cells 41 can be installed in the case body 21. An outer surface 221 of the bottom wall portion 211 of the case body 21 is formed substantially flush as shown in FIG. 5, while ribs 23, which appropriately have concave and convex shapes, are provided on an inner surface 222 of the bottom wall portion. The ribs 23 have an appropriately uneven shape, and are formed so as to protrude toward the inside of the case body 21. The ribs 23 are formed of three kinds of ribs, that is, support ribs 231, air guide ribs 232, and foreign material-introduction restricting ribs 233. As shown in FIGS. 5 and 6, the support ribs 231 mainly function as ribs that support the battery cells 41 to be installed in order to stabilize the installation state of the battery cells 41 that are to be installed in the case body 21. For this reason, the support ribs 231 are formed in the shapes of concave curved surfaces corresponding to the curved surface shapes of the outer peripheries of the battery cells 41 to be installed. Meanwhile, the support ribs 231 also contribute to improve the strength of the strength of the case body 21. Further, as shown in FIG. 6, the air guide ribs 232 function as guides for guiding cooling air when cooling air is sent to the second air vent openings 37 from the first air vent opening 36 for cooling the battery cells 41. For this purpose, the shapes of the air guide ribs 232 are selected so that air sent into the case body 21 can efficiently cool the battery cells 41. Meanwhile, the air guide ribs 232 also have the same function as the above-mentioned support ribs 231, that is, a function as ribs, which support the battery cells 41 to be installed, and the like. The foreign material-introduction restricting ribs 233 will be described after the description of the drain holes 25 that will be described next.

As shown in FIGS. 3 and 4, the case body 21 is provided with drain holes 25 having a function of discharging the water, which has been introduced into the housing case 20, to the outside of the housing case 20. Meanwhile, the drain holes 25 are included in a drainage function-shape portion according to the invention. The drain holes 25 are disposed at the bottom wall portion 211, which forms the bottom portion of the housing case 20, so that the inside and the outside of the housing case 20 communicate with each other. The arrangement positions of the drain holes 25 are set to be present between the lead plates 45, which are connected to the electrodes 42 of the above-mentioned battery cells 41, at the bottom wall portion 211 of the housing case 20. For this reason, as understood from the comparison between FIG. 2 and FIGS. 3 and 4, the drain holes 25 are disposed so as to be present between the four of the respective lead plates 45.

Individually and specifically, at the left portion of the bottom wall portion 211 of the housing case 20, a first drain hole 251 is disposed between the above-mentioned first and second left lead plates 461 and 462; a second drain hole 252 is disposed between the above-mentioned second and third left lead plates 462 and 463. In contrast, at the right portion of the bottom wall portion 211 of the housing case 20, a third drain hole 253 is disposed between the above-mentioned first and second right lead plates 471 and 472; a fourth drain hole 254 is disposed between the above-mentioned second and third right lead plates 472 and 473.

Figure 8:
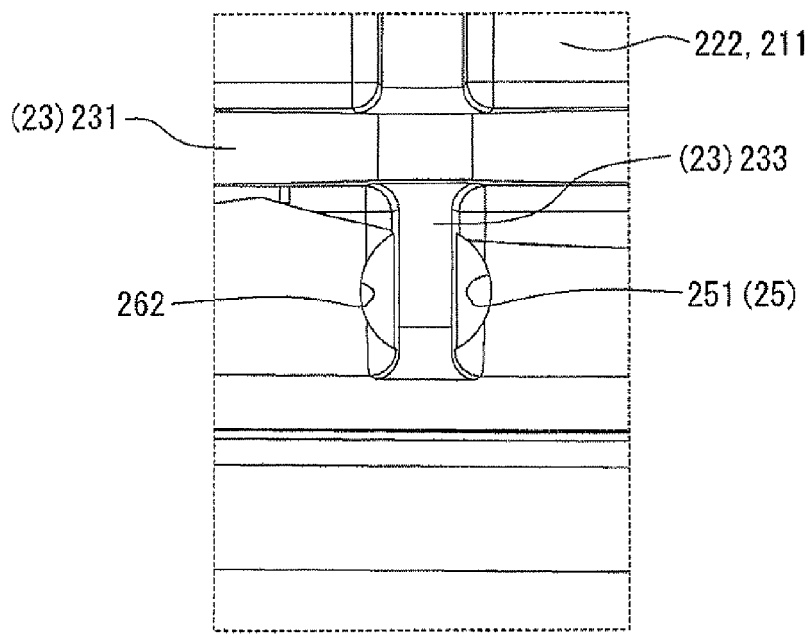
FIG. 8 is an enlarged top view of the arrangement portion of the case body where the drain hole is arranged.

That is, there are a total of four drain holes 25 disposed on the case body 21. There are a total of six lead plates 45, which means there are two fewer drain holes 25 than head plates 45. There are ten total battery cells 41, which means there are four fewer drain holes 25 than battery cells 41. Meanwhile, as shown in FIG. 8, the shapes of these drain holes 25 are set to have a circular shape in top view, and the diameters of the drain holes 25 are set to 2.5 mm that is not an excessively large diameter.

In other words, the first drain hole 251 drains water that is present between the first and second left lead plates 461 and 462, and the second drain hole 252 drains water that is present between the second and third left lead plates 462 and 463. Further, the third drain hole 253 drains water that is present between the first and second right lead plates 471 and 472, and the fourth drain hole 254 drains water that is present between the second and third right lead plates 472 and 473.

Here, the respective drain holes 25 (251, 252, 253, and 254) are set as described below and are disposed at the bottom wall portion 211 of the housing case 20. The drain hole 25 will be described with reference to FIGS. 6 and 8 that are enlarged views. Meanwhile, in the drain hole 25, an opening end edge of the drain hole 25, which is disposed at the outer portion of the housing case 20, is set as an outer end edge 261; an opening end edge of the drain hole 25, which is disposed at the inner portion of the housing case 20, is set as an inner end edge 262. That is, as shown in FIG. 6, the shape of the outer end edge 261 of the drain hole 25 (251) is set so that the outer end edge 261 slightly rises toward the inside of the housing case 20 as compared with a support lower surface 201 of the housing case 20 that corresponds to the peripheral portion of the outer end edge 261. For this reason, a clearance C is formed between the outer end edge 261 and the placement surface F with which the support lower surface 201 of the housing case 20 corresponding to the peripheral portion of the outer end edge 261 comes into contact.

Further, the foreign material-introduction restricting ribs 233 are provided in the housing case 20. That is, as shown in FIG. 6, the foreign material-introduction restricting rib 233 is provided at a position, which is spaced upward from the inner end edge 262 of the drain hole 25, on a portion that is positioned above the inner end edge 262 of the above-mentioned drain hole 25. That is, the foreign material-introduction restricting rib 233 is provided so as to be spaced upward from the inner end edge 262 of the drain hole 25 while the opened state of the drain hole 25 is maintained. Furthermore, as shown in FIG. 8, the foreign material-introduction regulating rib 233 is provided in the housing case 20 so as to cross the shape of the opening of the drain hole 25.

According to the battery pack 10 having the above-mentioned structure, it is possible to obtain the following functions and effects.

That is, according to the above-mentioned battery pack 10, since the arrangement positions of the drain holes 25 are set to be present between the lead plates 45 that are connected to the electrodes 42 of the battery cells 41, it is possible to discharge the water, which is present between the lead plates 45, to the outside of the housing case 20 from the inside of the housing case 20. Accordingly, since it is possible to drain water so that the water present at least between the lead plates 45 is removed, it is possible to prevent the electrical connection between the lead plates 45, which may be caused when the lead plates 45 soak in water. That is, even though appropriate ribs 23, such as the support ribs 231 and the air guide ribs 232, are formed in the housing case 20 so as to support the battery cells 41, it is possible to prevent the electrical connection between the lead plates 45, which may be caused when at least the lead plates 45 soak in the water, while allowing a puddle to be formed by the ribs 23. Accordingly, it is possible to prevent the unintended electrical connection between the lead plates 45, which may be caused when the lead plates 45 soak in water. That is, it is possible to efficiently drain the water, which has been introduced into the housing case 20, to the outside of the housing case 20 so that the leakage of the electricity charged in the battery cells 41 is prevented. Further, since positions of the drain holes 25 to be disposed is suppressed to be minimum positions that can prevent the unintended electrical connection between the lead plates 45, it is possible to make the number of holes for drainage be as small as possible.

Furthermore, according to the above-mentioned battery pack 10, since the lead plates 45 between which the arrangement positions of the drain holes 25 are set are the lead plates 45 that are adjacent to each other and have different electrical potentials, it is possible to set a position, where water is drained so as to be removed, between the lead plates 45 that are adjacent to each other and have different electrical potentials. Accordingly, since it is possible to set a position, where water is to be drained so as to be removed and an insulation state is to be maintained, to a position where a short circuit between the lead plates 45 easily occurs, it is possible to more reliably prevent a short circuit that is caused when the lead plates 45 soak in water.

Moreover, according to the above-mentioned battery pack 10, the shape of the outer end edge 261 of the drain hole 25, which is disposed at the outer portion of the housing case 20, is set so that the outer end edge 261 rises toward the inside of the housing case 20 as compared with the support lower surface 201 corresponding to at least the peripheral portion of the outer end edge 261. Accordingly, even when the battery pack 10 mounted on the tool body (not shown) is placed on a desk or the ground such that the support lower surface 201, which is the bottom portion of the battery pack 10, comes into contact with the placement surface F, the outer end edge 261 of the drain hole 25 is positioned above the placement surface F by the clearance C. Therefore, it is possible to prevent the drain hole 25 from being closed by the placement surface F, and hence it is possible to discharge the water, which is introduced into the housing case 20, to the outside of the housing case 20 from the drain hole 25. In addition, since it is possible to form the small clearance C between the outer end edge 261 of the drain hole 25 and the placement surface F, it is possible to easily guide the water, which is present in the housing case 20, to the outside of the housing case 20 by the surface tension of the water that has been introduced into the clearance C. Accordingly, it is possible to efficiently drain the water, which has been introduced into the housing case 20, to the outside of the housing case 20.

Further, according to the above-mentioned battery pack 10, the foreign material-introduction restriction rib 233, which crosses the shape of the opening of the drain hole 25 in the housing case 20, is provided in the housing case 20. Accordingly, even in the case of possible introduction of foreign materials into the housing case 20 from the outside of the housing case 20 through the drain hole 25, it is possible to hinder the introduction of the foreign materials by the foreign material-introduction restricting rib 233. Therefore, it is possible to maintain the inside of the housing case 20 clean.

Figure 9:
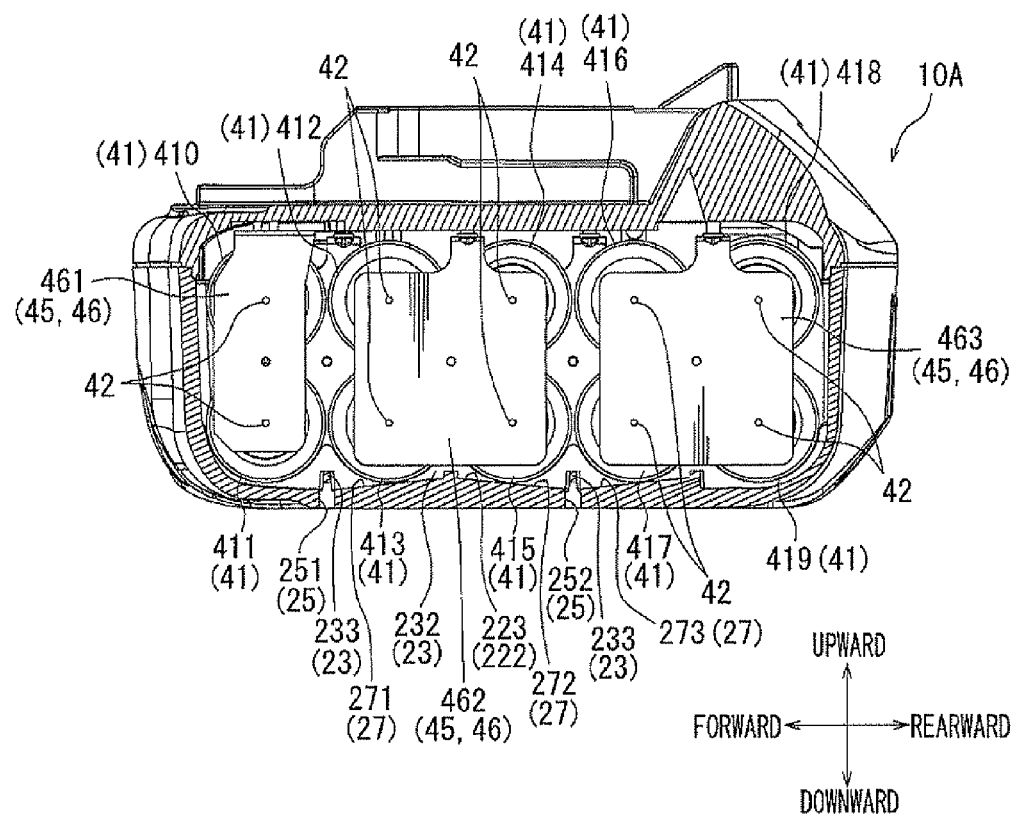
FIG. 9 is a cross-sectional view of a battery pack showing an example where drain passages are provided.
Figure 10:
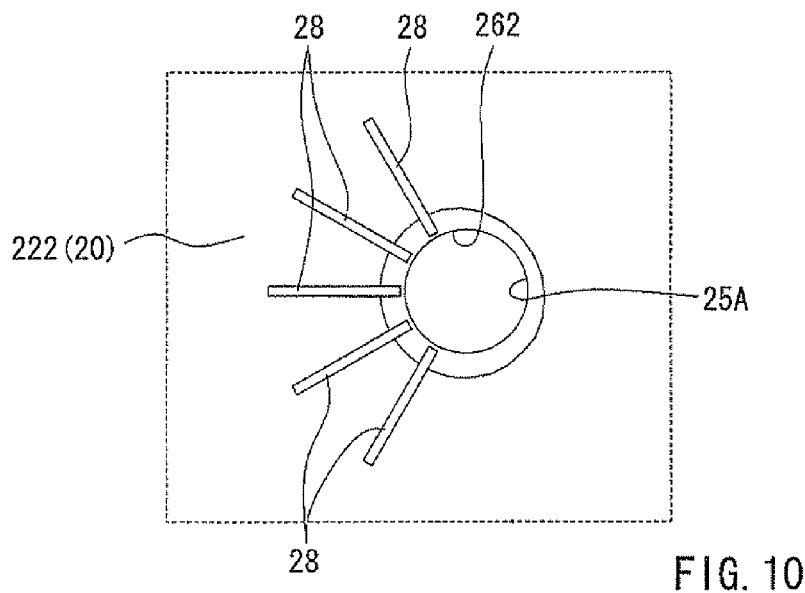
FIG. 10 is an enlarged top view of the drain hole showing an example where drawing grooves are provided.

Next, two modifications of the battery pack 10 of the first embodiment will be described with reference to FIGS. 9 and 10. FIG. 9 is a cross-sectional view of a battery pack 10A showing a modification where drain passages 27 are provided. FIG. 10 is an enlarged top view of a drain hole 25A showing a modification where drawing grooves 28 are provided.

The two modifications shown in FIGS. 9 and 10 are examples where the arrangement positions of the drain holes 25 are set to be present between the lead plates 45 as described above. The two modifications are examples where a flow guide device or a draw guide mean device is provided at a position different from the position between the lead plates 45 where the arrangement positions of the drain holes 25 are set.

Meanwhile, the flow guide device and the draw guide device are included in the drainage function-shape portion according to the invention. The flow guide device and the draw guide device are formed by forming a shape, which has a function of discharging the water having been introduced into the housing case 20 to the outside of the housing case 20, on the housing case 20.

These modifications are different from the above-mentioned battery pack 10 in that the structure of the drain passages 27 as the flow guide device or the structure of the drawing grooves 28 as the draw guide device is provided. For this reason, this battery pack 10 configuration is the same as the above-mentioned battery pack 10 except for the different drain passage 27. Accordingly, portions having the same structure as the structure of the portions of the above-mentioned battery pack 10 are denoted by the same reference numerals as the reference numerals used in the above-mentioned battery pack 10 or the same reference numerals that have "A" at the ends thereof and the description thereof will be omitted.

Meanwhile, in the modifications that will be described below, the arrangement positions of the drain holes 25 are set to be present between the lead plates 45 as in the above-mentioned battery pack 10. In contrast, the structure of the drain passages 27 as the flow guide device or the structure of the drawing grooves 28 as the draw guide device is set at a position different from the position between the lead plates 45.

First, a modification where the drain passages 27 are provided in the battery pack 10A will be described. The battery pack 10A shown in FIG. 9 is provided with the drain passages 27 as the flow guide device. The drain passages 27 serve to guide the flow of water so that water flows toward the drain holes 25. That is, the drain passages 27 are formed on a bottom surface 223 of the bottom wall portion 211 of the case body 21 that forms the inner surface 222 of the housing case 20. The drain passage 27 is formed so that the bottom surface 223 is inclined downward toward the drain hole 25. Specifically, on the bottom surface 223 that is positioned below the second left lead plate 462, a front half of the drain passage is formed as a first drain passage 271 inclined downward toward the first drain hole 251; a rear half thereof is formed as a second drain passage 272 inclined downward toward the second drain hole 252. That is, the bottom surface 223, which is positioned below the second left lead plate 462, is formed in the shape of a mountain, of which the bases extend forward and rearward from a portion positioned below the middle of the second left lead plate 462 as a peak. Further, on the bottom surface 223 that is positioned below the third left lead plate 463, a front half of the drain passage is formed as a third drain passage 273 inclined downward toward the second drain hole 252. That is, the bottom surface 223, which is positioned below the third left lead plate 463, is formed in the shape of the half of a mountain, of which the base extends forward from a portion positioned below the middle of the third left lead plate 463 as a peak. Meanwhile, the bottom surface 223, which forms the inner surface 222, of the bottom wall portion 211 of the case body 21 is formed obliquely; the outer surface 221, which comes into contact with the above-mentioned placement surface F so as to be supported, is formed to be flush.

According to the battery pack 10A of this modification, it is possible to obtain the following functions and effects in addition to the functions and effects that are obtained by the above-mentioned battery pack 10. That is, according to the above-mentioned battery pack 10A, since the drain passages 27 as the flow guide device are formed so that the bottom surface 223 of the housing case 20 is inclined downward toward the drain holes 25, it is possible to make the water, which has been introduced into the housing case 20, flow toward the drain holes 25 by the inclined structure of the drain passages 27. Accordingly, it is possible to improve the drainage performance of not only the vicinity of the drain holes 25 but also portions forming the drain passages 27, so that it is possible to expand a range that is desired to improve the drainage performance. Further, according to this battery pack 10A, it is possible to guide the water, which is present in the peripheral portion of the drain holes 25, to the drain holes 25 by the drain passages 27 as the flow guide device, while it is possible to completely remove the water, which is present between these lead plates 45, by using the presence of the drain holes 25. Accordingly, it is possible to reliably prevent the unintended electrical connection between the lead plates 45.

Next, a modification where the drawing grooves 28 are provided at drain holes 25A will be described.

The drain hole 25A shown in FIG. 10 is provided with the drawing grooves 28 as the draw guide device. The drawing grooves 28 serve to draw and guide water so that water is collected toward the drain hole 25A. That is, the drawing grooves 28 act so as to draw water toward the drain hole 25. In other words, the drawing grooves 28 are formed in a concave groove shape so as to radially extend on the inner surface 222 of the housing case 20 from the inner end edge 262 of the drain hole 25. Specifically, five drawing grooves 28, which radially extend in a concave groove shape, are formed in a peripheral portion, which is shown on the left side in the drawing, of the drain hole 25A. The five drawing grooves 28 are appropriately cut into a surface of the peripheral portion so as to have a small depth and are formed at appropriate intervals from each other.

According to the drain hole 25A of this modification, it is possible to obtain the following functions and effects in addition to the functions and effects that are obtained by the above-mentioned battery pack 10. That is, since the drawing grooves 28 as the draw guide device are formed in a concave groove shape so as to radially extend on the inner surface 222 of the housing case 20 from the inner end edge 262 of the drain hole 25, the drawing grooves 28 can act so as to draw the water, which is present in the peripheral portion of the inner end edge 262, toward the drain hole 25. For this reason, it is possible to make the complete drainage of the water, which is present between the lead plates 45, so as to affect to the peripheral portion of the drain hole 25A. Accordingly, it is possible to more reliably prevent the electrical connection between the lead plates, which may be caused when the above-mentioned lead plates 45 soak in water. Further, with the battery pack provided with the drain holes 25A, it is possible to guide the water, which is present in the peripheral portion of the drain holes 25, to the drain holes 25A by the drawing grooves 28 as the draw guide device and to completely remove the water, which is present between these lead plates 45, by using the presence of the drain holes 25A. Accordingly, it is possible to reliably prevent the unintended electrical connection between the lead plates 45.

Second Embodiment

Figure 11:
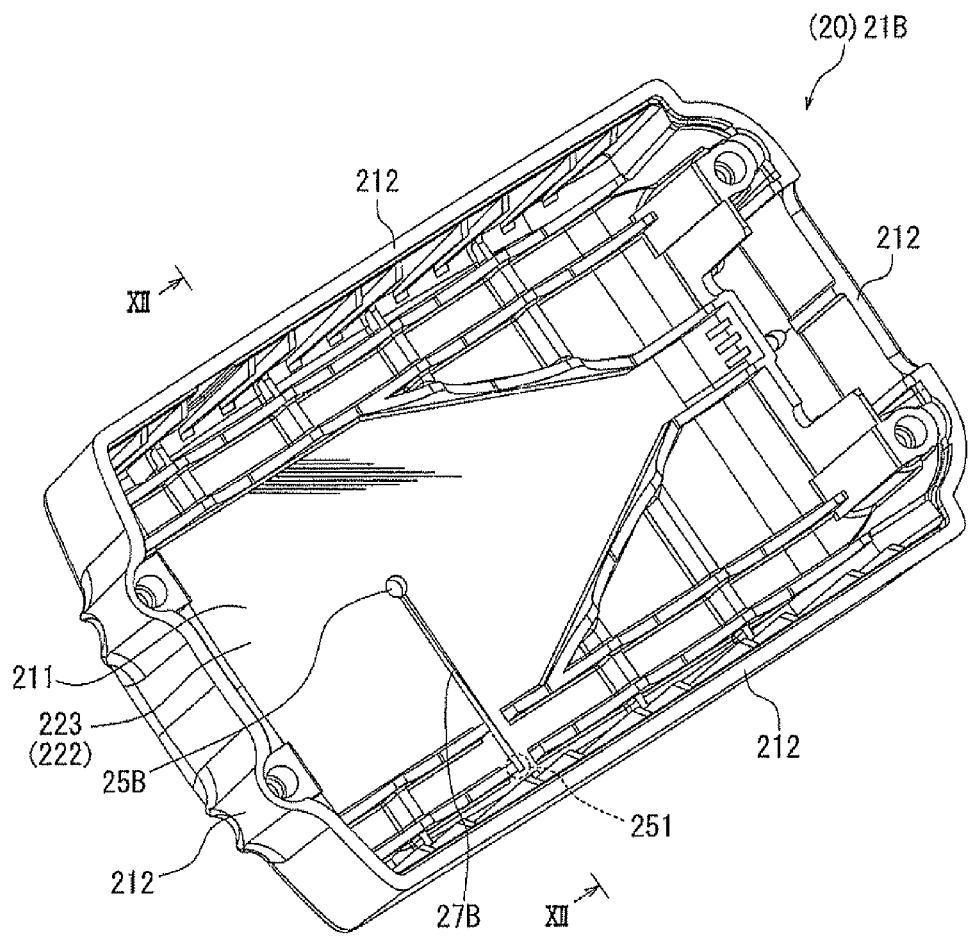
FIG. 11 is a perspective view of the case body that is seen in perspective so that the inside of the case body is seen.
Figure 11:
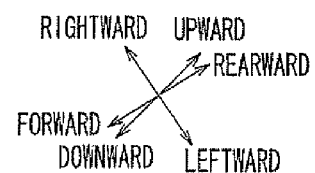

Next, the second embodiment, which embodies the battery pack according to the invention, will be described with reference to FIGS. 11 and 12. Here, a perspective view of FIG. 11 is a perspective view of a case body 21B that is viewed in perspective so that the inside of the case body is seen. Further, a cross-sectional view of FIG. 12 is a cross-sectional view of the case body 21B of FIG. 11 taken along line XII-XII.

That is, although the entire view is not shown, the battery pack of the second embodiment is different from the battery pack 10 of the above-mentioned first embodiment only in the structure of the case body 21. That is, in the battery pack of the second embodiment, a part of the structure of a drain passage 27B as a flow guide device is set to be present between the lead plates 45; a drain hole 25B is set to a position different from the position between the lead plates 45 unlike in the modification of the above-mentioned first embodiment.

The second embodiment is different from the above-mentioned battery pack 10 in the arrangement structure of the drain passage 27B used as a flow guide device and in the arrangement structure of the drain hole 25B. For this reason, since the structure, except for these different structures, is the same as that of the above-mentioned battery pack 10, the same reference numerals as the reference numerals described in the above-mentioned battery pack 10 are given in the drawings and the description of the same structure will be omitted.

Figure 12:
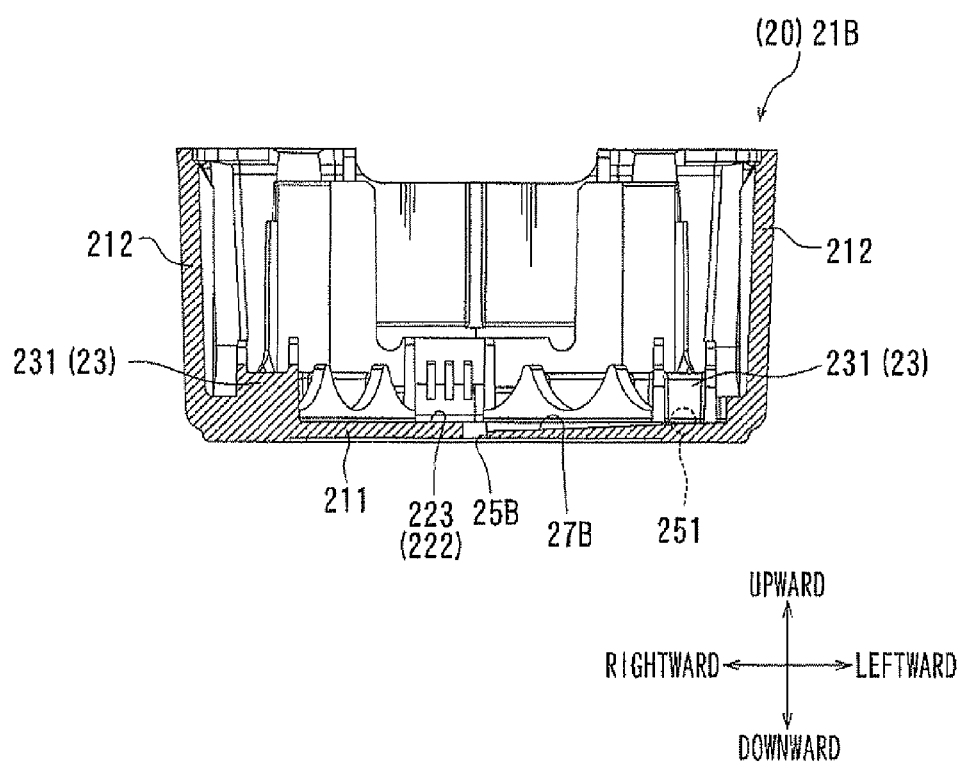
FIG. 12 is a cross-sectional view of the case body taken along line XII-XII in FIG. 11.

That is, as shown in FIGS. 11 and 12, the bottom wall portion 211 of the case body 21B corresponding to the bottom portion according to the invention is provided with the drain hole 25B. As shown in FIGS. 11 and 12, the drain hole 25B is formed substantially at the center of the bottom wall portion 211. Like the above-mentioned drain hole 25, the drain hole 25B has a function of discharging the water, which has been introduced into the housing case 20, to the outside of the housing case 20. However, while the arrangement position of the drain hole 25 of the battery pack 10 of the above-mentioned first embodiment has been set to be present between the lead plates 45, the arrangement position of the drain hole 25B of the battery pack of the second embodiment is set to the middle of the bottom wall portion 211 with respect to a left and right direction. Like the above-mentioned drain hole 25, the drain hole 25B is disposed so that the inside and the outside of the housing case 20 communicate with each other. In contrast, the drain passage 27B is formed on the bottom surface 223 of the bottom wall portion 211 of the case body 21, which forms the inner surface 222 of the housing case 20, so as to extend in the left and right direction of the case body 21. Specifically, the drain passage 27B is formed in the shape of a groove that is inclined downward toward the drain hole 25B, which is formed substantially at the center of the bottom wall portion 211, from a portion (a portion that is marked with a circle shown in FIGS. 11 and 12 by a phantom line), where the first drain hole 251 of the above-mentioned first embodiment is disposed, as a peak. That is, the highest portion of the drain passage 278 is set to be positioned between the above-mentioned first and second left lead plates 461 and 462 (corresponding to a position where the first drain hole 251 of the first embodiment is disposed). Further, the lowest portion of the drain passage 27B is a portion where the drain hole 25B is disposed.

According to the battery pack of the second embodiment, the arrangement position of the drain hole 25B is set substantially to the center of the bottom wall portion 211 and a peak portion of the drain passage 27B is set to be positioned between the first and second left lead plates 461 and 462 (corresponding to the position where the first drain hole 251 of the first embodiment is disposed). Accordingly, it is possible to drain the water, which is present between the lead plates 45, to the outside of the housing case 20 from the inside of the housing case 20 and to set the arrangement position of the drain hole 25B substantially to the center of the bottom portion of the housing case 20 according to the design of the battery pack. Therefore, it is possible to increase the degree of freedom of the arrangement position of the drain hole 25B, so that it is also possible to increase the degree of freedom in the design of the battery pack.

Meanwhile, the battery pack according to the invention is not limited to the above-mentioned embodiments and portions may be appropriately changed as will be described below.

That is, in the above-mentioned embodiments, the inclined structure of the drain passages 27 as the flow guide device and the drawing structure of the drawing grooves 28 have been described as an example of the drainage function-shape portion. However, the drainage function-shape portion according to the invention is not limited to such an example, and may be of any portion as long as it is formed to have a function of discharging the water, which has been introduced into the housing case, to the outside of the housing case while including a drain hole that makes the inside and outside of the housing case 20 communicate with each other. For example, various shapes, such as those having an appropriate inclination, appropriate grooves, or appropriate steps, may be selected. Further, the drain holes 25, which makes the inside and outside of the housing case communicate with each other as described above, may form the drainage function-shape portion according to the invention alone.

Second Example

Next, third and fourth embodiments, which are embodied in a second example shown in FIGS. 13 to 21, will be described.

Third Embodiment

The third embodiment, which embodies the battery pack according to the invention, will be described below with reference to FIGS. 13 to 17.

Figure 13:
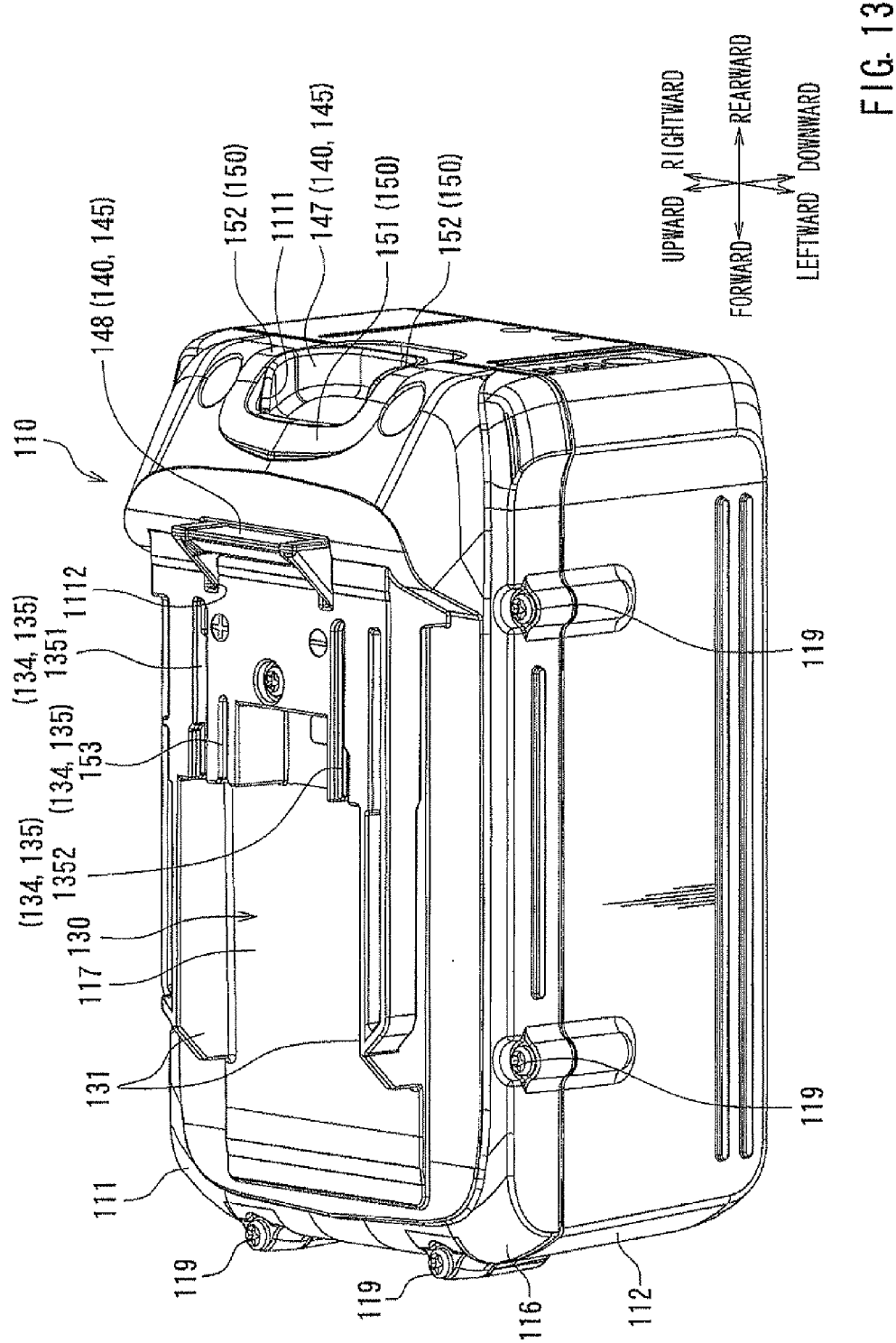
FIG. 13 is a perspective view of the appearance of a battery pack of a third embodiment that is embodied in a second example.
Figure 14:
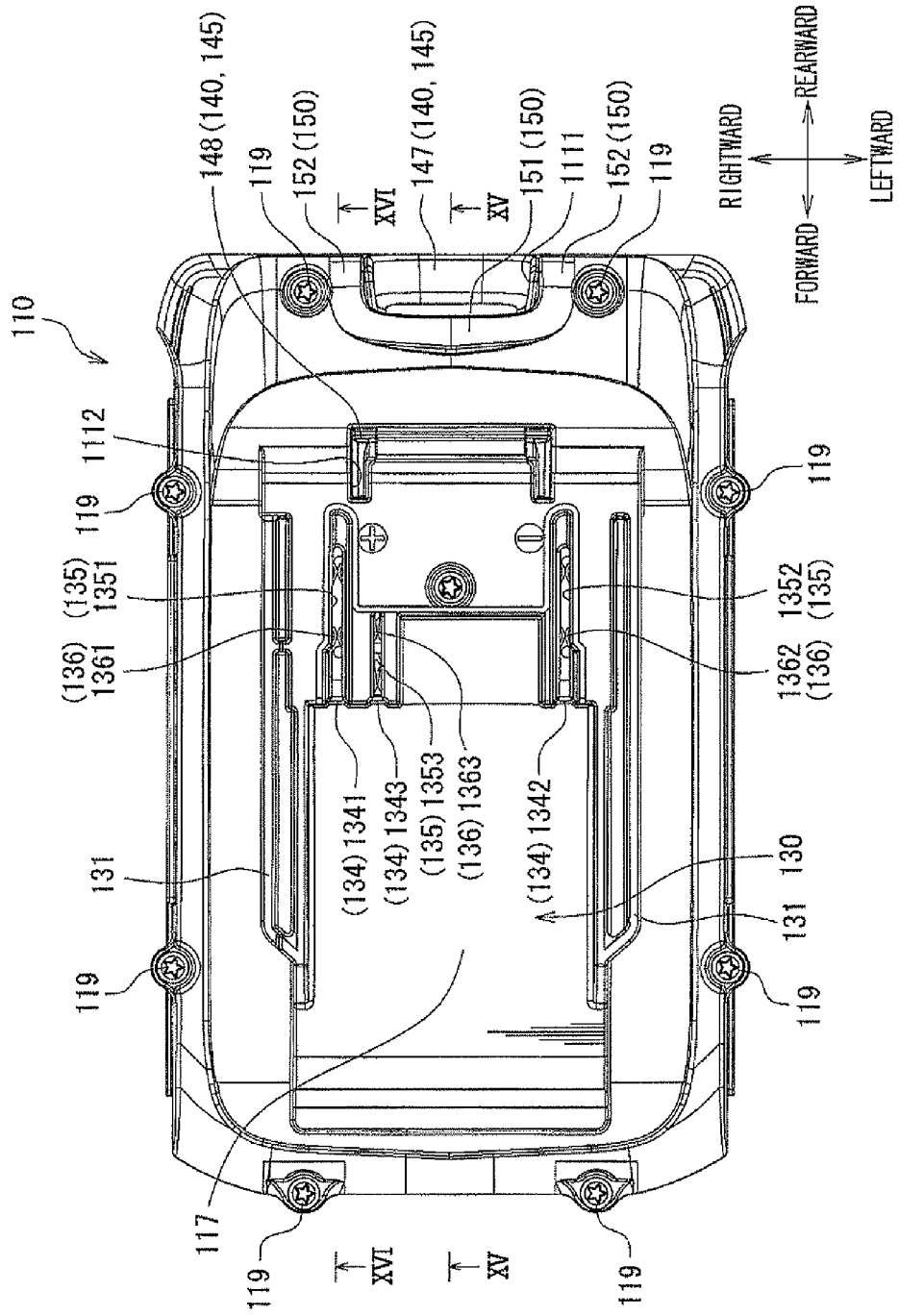
FIG. 14 is a top view of the battery pack of FIG. 13.
Figure 15:
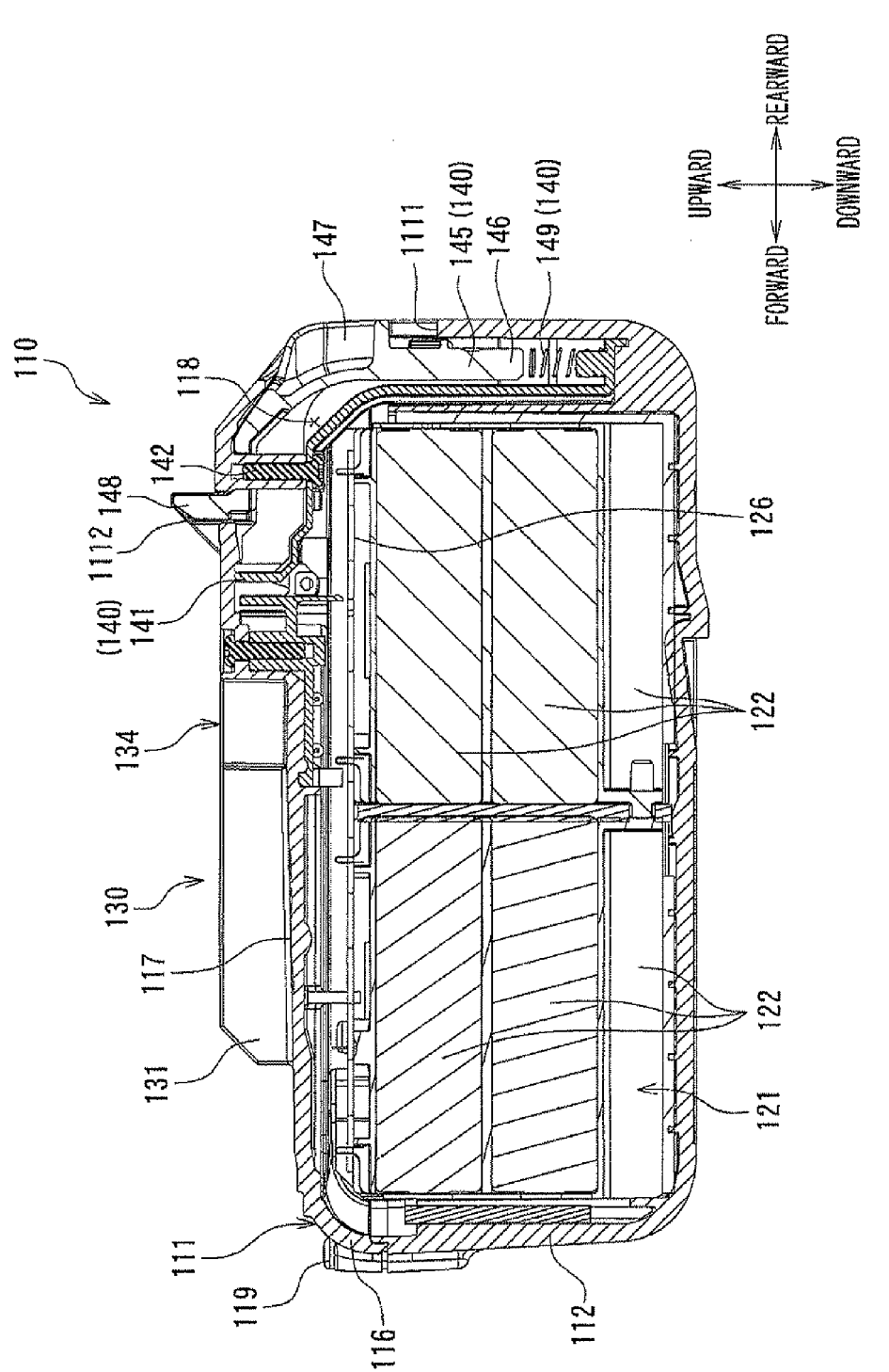
FIG. 15 is a cross-sectional view of the battery pack taken along line XV-XV in FIG. 14.
Figure 16:
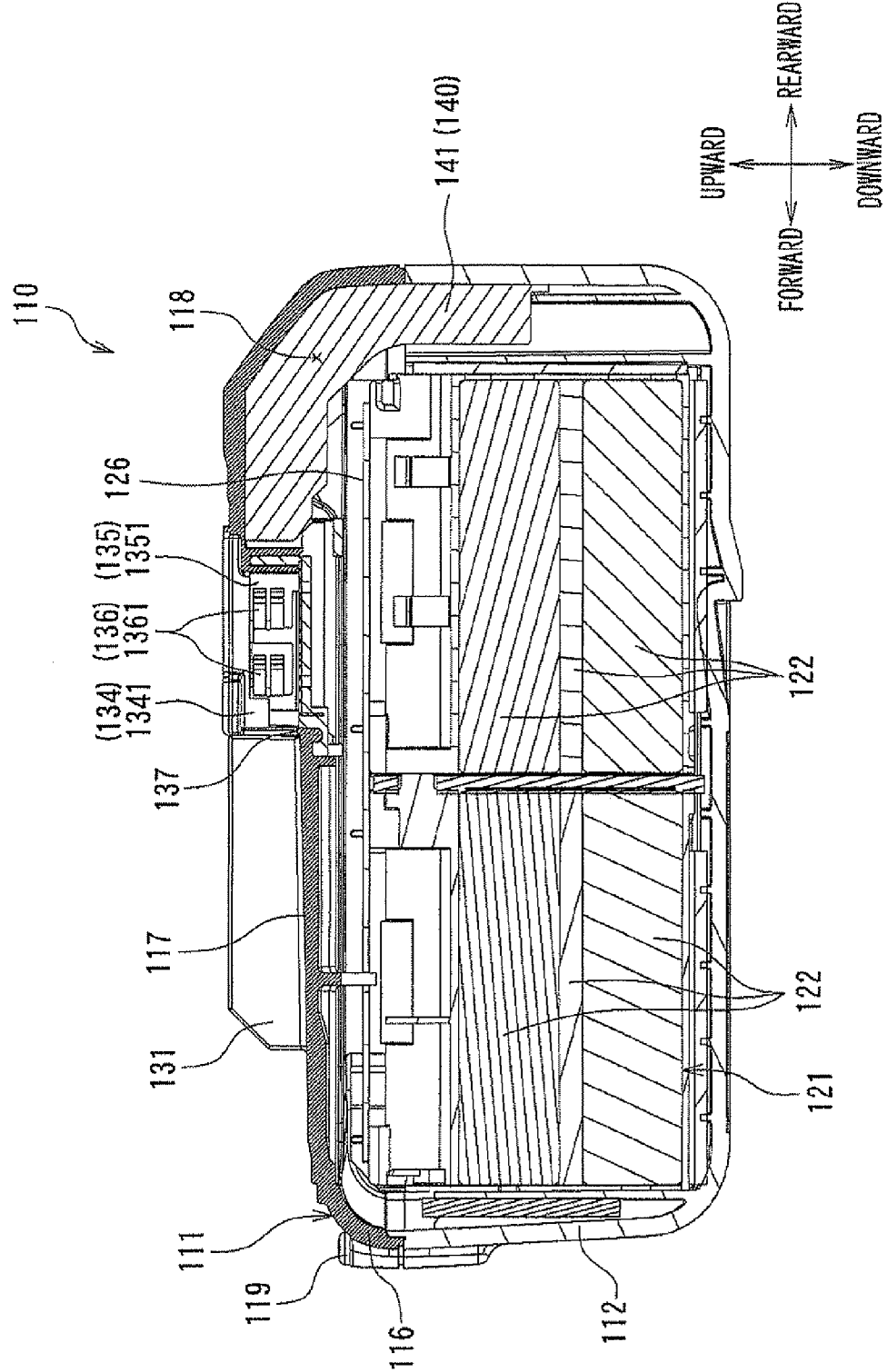
FIG. 16 is a cross-sectional view of the battery pack taken along line XVI-XVI in FIG. 14.

FIG. 13 shows the appearance of a battery pack 110, which is the third embodiment embodied in the second example, in perspective. FIG. 14 shows the battery pack 110 that is seen from above. FIG. 15 shows the cross-section of the internal structure of the battery pack 110 taken along line XV-XV in FIG. 14. FIG. 16 shows the cross-section of the internal structure of the battery pack 110 taken along line XVI-XVI in FIG. 14. Meanwhile, in the following description, the electrical connection side of the battery pack 110 is defined as the upper side and the slide mounting direction of the battery pack 110 is defined as a front side.

The battery pack 110 shown in FIGS. 13 to 16 is adapted to be detachably mounted by sliding onto a tool body of an electric tool that is typified by, for example, an electric screwdriver. The battery pack 110 serves as a drive power source of the tool body on which the battery pack 110 has been mounted. That is, when the charge amount of the battery pack 110 is reduced, the battery pack 110 is removed from the tool body and charged by a dedicated external charger. After being completely charged by the dedicated charger, the battery pack 110 is mounted on the tool body and functions as a drive power source. Meanwhile, the battery pack 110 is adapted to be mounted (slid to be mounted) on a tool body (not shown) or a dedicated charger (not shown) by sliding when the battery pack 110 is to be mounted on the tool body or the dedicated charger.

As shown in FIG. 15, etc., the battery pack 110 generally includes a housing case 111 and an internal installation body 121.

The housing case 111 has a function as an outer cover of the battery pack 110 and a function as a housing in which the internal installation body 121 is disposed. The housing case 111 includes a box-shaped case body 112 of which an upper portion is opened, and an upper cover member 116 that closes the opened upper portion of the case body 112 as an upper cover of the case body 112. The case body 112 is configured so that the internal installation body 121 can be disposed in the box-shaped inner portion of the case body. The upper cover member 116 is mounted so as to close the opened upper portion of the case body 112 where the internal installation body 121 is disposed in the box-shaped inner portion, and is fastened by fastening screws 119 as shown in FIGS. 13 and 14. Accordingly, the housing case 111 is formed of a housing in which the internal installation body 121 is disposed. Meanwhile, an opening shape is formed on the housing case 111 for communicating with the inside of the housing case 111 from the outside of the housing case 111 in order to arrange electrical connection portions 134 and a male hook mechanism 140 that will be described in detail below.

The internal installation body 121 has a function as a power source of the battery pack 110. That is, as shown in FIGS. 15 and 16, the internal installation body 121 includes a plurality of battery cells 122 and a control board 126 that is electrically connected to the plurality of battery cells 122. The battery cells 122 are formed of battery cells, which can be charged, so that the battery pack 110 functions as a drive power source of a tool body. The plurality of battery cells 122 are disposed within the above-mentioned housing case 111, and are electrically connected to the control board 126. The control board 126 appropriately performs controls when the battery cells 122 are charged or discharged. Meanwhile, the control board 126 is electrically connected to a connection terminal 1361 of a positive connection portion 1341, a connection terminal 1362 of a negative connection portion 1342, and a connection terminal 1363 of a control connection portion 1343 that are shown in FIG. 14 and will be described below.

Incidentally, a slide mounting portion 130, which is to be mounted on a tool body (not shown) or a dedicated charger (not shown), is provided on the upper surface of the above-mentioned housing case 111. The slide mounting portion 130 has a function of allowing the battery pack 110 to slide to be mounted on the tool body (not shown) or the dedicated charger (not shown). For this reason, the slide mounting portion 130 has a function of guiding the slide mounting of the battery pack 110, and a function as an electrical connection portion for allowing the electrical connection with the battery pack 110 that is mounted by sliding. That is, the slide mounting portion 130 includes the slide guide portions 131 that guide the slide mounting of the battery pack 110, and the electrical connection portions 134 that electrically connect the battery pack 110.

The slide guide portions 131 are formed in male guide shapes that protrude in a left-and-right width direction in the shape of an outer flange and extend in a front and rear direction. The slide guide portions 131 can be fitted to female guide shapes, which are formed on the tool body (not shown) or the dedicated charger (not shown), in the slide direction. For this reason, the slide guide portions 131 are formed in the shapes of outer flanges, which appropriately protrude in the left-and-right width direction, so as to make a pair in the left-and-right width direction on an upper surface 117 of the battery pack 110. Meanwhile, the front side of the battery pack 110, which is defined in the drawings as described above, conforms to the slide mounting direction and the rear side of the battery pack 110. The rear side of the battery pack is defined in the drawings and conforms to a removal direction.

The electrical connection portions 134 are provided on the rear side of the above-mentioned slide guide portions 131. The electrical connection portions 134 are portions that are electrically connected to the connection terminals provided on the tool body when the battery pack 110 is slid to be mounted on the tool body as a mounting target. For this reason, the electrical connection portions 134 are formed of the three connection portions. That is, the positive and negative connection portions 1341 and 1342 that are connection portions for the charge or discharge of electric power, while the control connection portion 1343 is a connection portion to be connected to the above-mentioned control board 126.

These three electrical connection portions 134 (the positive connection portion 1341, the negative connection portion 1342, and the control connection portion 1343) generally include terminal receiving grooves 135 and battery-side connection terminals 136, which are individually and specifically configured as described below. Meanwhile, since the positive and negative connection portions 1341 and 1342 are symmetrically formed so as to make a pair, the positive connection portion 1341 will be described in the following description, and the same description will be applied to the negative connection portion 1342.

That is, the positive connection portion 1341 (the negative connection portion 1342) includes a receiving groove 1351 (a receiving groove 1352) as the terminal receiving groove 135 and a connection terminal 1361 (a connection terminal 1362) as the battery-side connection terminal 136. The receiving groove 1351 is a concave groove that extends in the front and rear direction of the battery pack 110. For example, a tool body-side connection terminal (not shown) for supplying electric power is slid to be fitted into the receiving groove 1351. The connection terminal 1361 is disposed in the receiving groove 1351. The connection terminal 1361 is electrically connected to the tool body-side connection terminal (not shown) that is slid to be fitted into the concave groove of above-mentioned receiving groove 1351. The connection terminal 1361 is formed by leaf spring-type metal terminals that are disposed so as to face each other as shown in FIGS. 14 and 16.

The control connection portion 1343 is provided between the above-mentioned positive and negative connection portions 1341 and 1342. The control connection portion 1343 includes a receiving groove 1353 as the terminal receiving groove 135 and a connection terminal 1363 as the battery-side connection terminal 136. The receiving groove 1353 is a concave groove extending in the front and rear direction of the battery pack 110. For example, a tool body-side control connection terminal (not shown) is slid to be fitted into the receiving groove 1353. Meanwhile, the length of the receiving groove 1353 is set to be shorter than the length of the receiving groove 1351 (the receiving groove 1352) of the above-mentioned positive connection portion 1341 (the negative connection portion 1342). The connection terminal 1363, which has the same structure as the structure of the connection terminal 1361 (the connection terminal 1362) of the above-mentioned positive connection portion 1341 (the negative connection portion 1342), is disposed in the receiving groove 1353.

Meanwhile, the connection terminal 1361 of the positive connection portion 1341, the connection terminal 1362 of the negative connection portion 1342, and the connection terminal 1363 of the control connection portion 1343 are electrically connected to the above-mentioned control board 126. For this purpose, opening shapes, which communicate with the inside of the housing case 111 from the outside of the housing case 111 for allowing connection to the control board 126, are formed at a portion where the connection terminal 1361 (the positive connection portion 1341) is arranged, an portion where the connection terminal 1362 (the negative connection portion 1342) is arranged, and a portion where the connection terminal 1363 (the control connection portion 1343) is arranged. The communicating opening shapes correspond to a communication opening according to the invention.

For this reason, the peripheral portion of the portion where the connection terminal 1361 (the positive connection portion 1341) is arranged, the peripheral portion where the connection terminal 1362 (the negative connection portion 1342) is arranged, and the peripheral portion where the connection terminal 1363 (the control connection portion 1343) is arranged are portions that correspond to the vicinity of the communication opening according to the invention. Specifically, portions on the front side of the electrical connection portions 134, which include these connection terminals 1361, 1362, and 1363, are set as the peripheral portions of the arrangement portions of these connection terminals 1361, 1362, and 1363 and are portions that correspond to the vicinity of the communication opening according to the invention. Here, portions on the front side of the electrical connection portions 134 including the connection terminals 1361, 1362, and 1363 are positioned between the slide guide portions 131. They also serve as upper surface portions of the upper cover member 116. Additionally, they serve as the upper surface of the housing case 111. Finally, they also serve as the upper surface 117 of the battery pack 110 as a whole.

Figure 17:
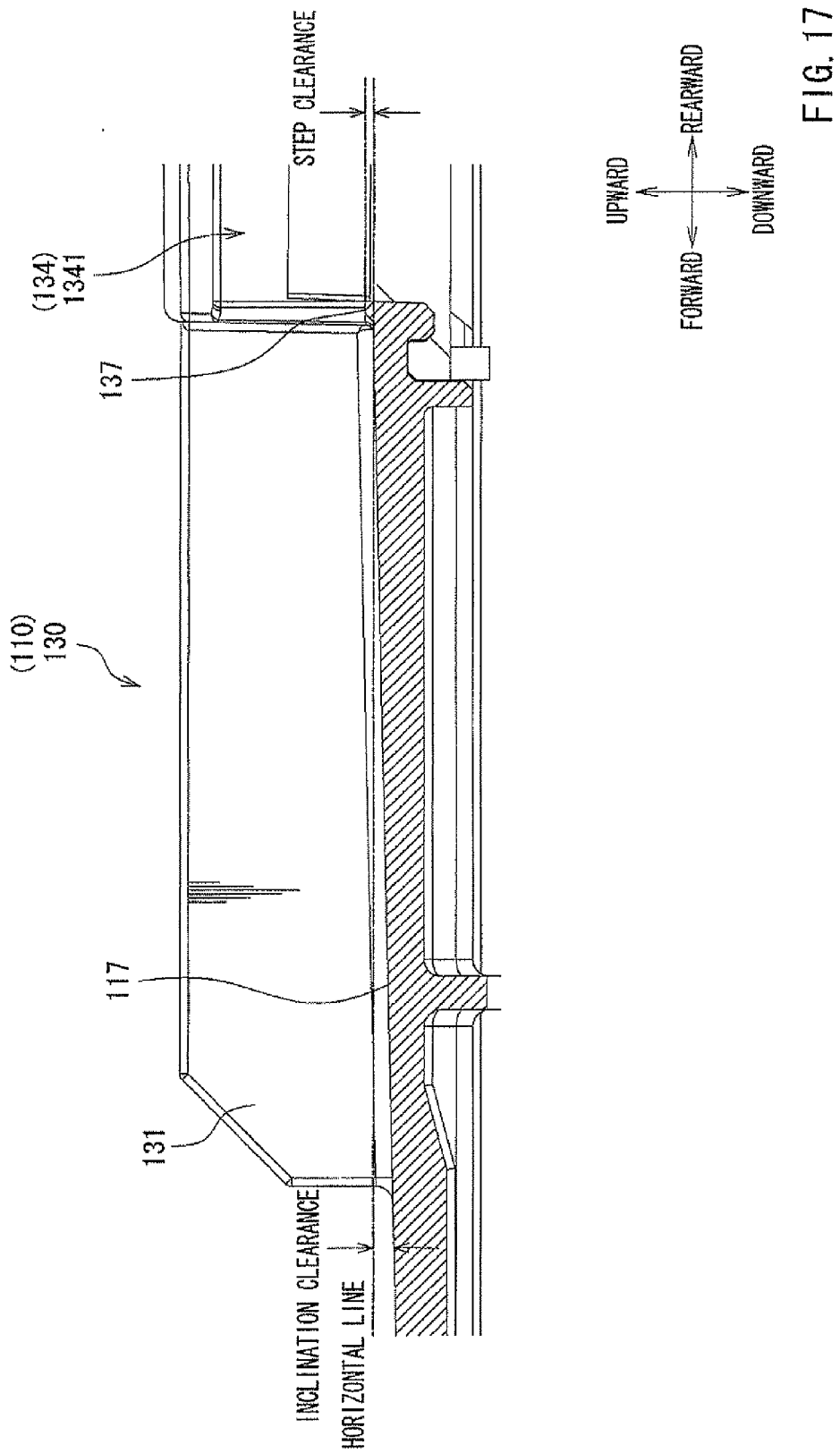
FIG. 17 is an enlarged cross-sectional view of the upper surface of the battery pack shown in FIG. 16.

FIG. 17 shows the upper surface 117 of the battery pack 110 in an enlarged version of that shown in FIG. 16 for easy understanding of the upper surface 117 of the battery pack 110 positioned on the front side of the electrical connection portions 134 having the connection terminals 1361, 1362, and 1363. Meanwhile, the battery pack 110 shown in FIG. 17 is shown as the upper surface 117 of the battery pack 110 when the battery pack 110 is placed on the horizontal surface. Further, in FIG. 17, a horizontal line is shown for the upper surface 117 for easy understanding of the inclined structure of the upper surface 117 of the battery pack 110.

As shown in FIG. 17, the upper surface 117 of the battery pack 110 is formed to have an inclined structure (the shape of an inclined flat surface). The upper surface 117 of the battery pack 110 has the shape of a substantially flat surface, and has an angle of inclination such that it is inclined downward with respect to the battery pack 110 toward the front side of the battery pack 110. In other words, the upper surface 117 of the battery pack 110 is formed in the shape of a flat surface that is inclined upward toward the electrical connection portions 134 positioned at the rear portion of the battery pack 110.

That is, since the upper surface 117 of the battery pack 110 has an inclined structure having the shape of a flat surface that is inclined downward with respect to the battery pack 110 toward the front side of the battery pack 110, the upper surface 117 of the battery pack 110 constitutes a water-introduction restricting portion according to the invention. That is, when water is put on the upper surface 117 of the battery pack 110 such as when water is splashed on the battery pack 110, the water present on the upper surface 117 of the battery pack 110 does not flow toward the portions where the electrical connection portions 134 are arranged (the portion where the connection terminal 1361 of the positive connection portion 1341 is arranged, the portion where the connection terminal 1362 of the negative connection portion 1342 is arranged, and the portion where the connection terminal 1363 of the control connection portion 1343 is arranged) on the upper surface 117 of the battery pack 110 but flows toward the front side of the battery pack 110 that is opposite to the portions where the electrical connection portions 134 are arranged. In other words, water present on the upper surface 117 of the battery pack 110 flows in the direction away from the portions where the electrical connection portions 134 are arranged (the portion where the connection terminal 1361 of the positive connection portion 1341 is arranged, the portion where the connection terminal 1362 of the negative connection portion 1342 is arranged, and the portion where the connection terminal 1363 of the control connection portion 1343 is arranged), so that the introduction of water into the portions where the electrical connection portions 134 (the connection terminals 1361, 1362, and 1363) are arranged is restricted.

Incidentally, as shown in FIG. 17, a stepped portion 137 is formed at a boundary portion between the above-mentioned electrical connection portion 134 (the positive connection portion 1341) and the upper surface 117 of the battery pack 110 positioned on the front side of the electrical connection portion 134 (the positive connection portion 1341). The stepped portion 137 is formed by making the front end portion of the electrical connection portion 134 (the positive connection portion 1341), which is set at the boundary portion, to have a shape protruding toward the upper side of the battery pack 110.

Meanwhile, since FIG. 17 is an enlarged view of FIG. 16, the stepped portion 137 formed at the front end portion of the positive connection portion 1341 as the electrical connection portions 134 has been described. However, the same stepped portions 137 as the stepped portion 137 formed at the front end portion of the positive connection portion 1341 are also formed at the respective front end portions of the negative connection portion 1342 and the control connection portion 1343 as the electrical connection portions 134.

On the other hand, a male hook mechanism 140, which is fitted to a female hook portion (not shown) formed on the tool body when the battery pack is mounted on the above-mentioned tool body (mounting target), is formed at the rear portion of the above-mentioned battery pack 110. The male hook mechanism 140 corresponds to a male hook portion according to the invention. The male hook mechanism 140 is disposed so as to be received in a receiving space (a mechanism receiving space 118) that is formed between the above-mentioned housing case 111 and the internal installation body 121. A male hook mechanism 140 disposed in the mechanism receiving space 118 will be explained below.

As shown in FIGS. 15 and 16, the male hook mechanism 140 includes a base member 141, a male hook body 145, and a biasing coil spring 149. As shown in FIG. 15, the base member 141 is fixed to the housing case 111 by a screw member 142, so that the base member 141 is disposed in the above-mentioned mechanism receiving space 118. The base member 141 has a structure that isolates the above-mentioned housing case 111 and the internal installation body 121 from each other. That is, although not specifically shown, the base member 141 is formed so that substantially the entire peripheral edge of the base member comes into contact with the inner surface of the housing case 111. Thus, since substantially the entire peripheral edge of the base member comes into contact with the housing case 111 as described above, the base member 141 may isolate the housing case 111 and the internal installation body 121 from each other. For this reason, the inside of the base member 141 is not seen in FIG. 16 that is a cross-sectional view of the battery pack 110 of FIG. 14 taken along line XVI-XVI.

The male hook body 145 is disposed between the above-mentioned base member 141 and the housing case 111. The male hook body 145 is a member that moves up and down relative to the base member 141 and the housing case 111. For this reason, as shown in FIG. 15, the male hook body 145 is formed so as to extend in the up and down direction in the housing case 111 while being bent along the upper and rear surfaces of the housing case 111. The male hook body 145 generally includes a biasing guide portion 146, an operation portion 147, and a hook portion 148 in order from the lower side to the upper side shown in FIG. 15.

The biasing guide portion 146 forms the lower portion of the male hook body 145, and comes into contact with the upper end of the biasing coil spring 149. Further, the biasing guide portion 146 is positioned between the above-mentioned base member 141 and the housing case 111, so that the movement of the biasing guide portion 146 in the front and rear direction and the left and right direction is restricted. For this reason, the biasing guide portion 146 has a function of guiding the movement of the male hook body 145 in the up and down direction while receiving a biasing force of the biasing coil spring 149. In contrast, the operation portion 147 and the hook portion 148 are formed so as to be exposed to the outside. The operation portion 147 is formed in the middle portion of the male hook body 145, and is formed in an appropriate concave shape that allows an operation finger of a user to be caught as also shown in FIG. 13. The operation portion 147 is adapted to be exposed to the outside through an operation portion exposure window 1111 that is formed at the rear portion of the housing case 111. The hook portion 148 is formed at the upper end of the male hook body 145, and is formed in the shape of a male hook protruding upward as also shown in FIG. 13. The hook portion 148 is adapted to be exposed to the outside through a hook portion exposure window 1112 that is formed at the upper portion of the housing case 111. The hook portion 148 is formed in the shape of a male hook having an appropriate tapered shape so as to be capable of being fitted to a female hook portion (not shown), which is provided on the tool body or the dedicated charger, according to the slide mounting of the battery pack 110.

For this purpose, the operation portion exposure window 1111 and the hook portion exposure window 1112, which have shapes of openings communicating with the inside of the housing case 111 from the outside of the housing case 111, are formed at the housing case 111 in order to expose the above-mentioned operation portion 147 and the hook portion 148 to the outside. Specifically, the operation portion exposure window 1111 is formed at the rear portion of the housing case 111 so that the above-mentioned operation portion 147 can be operated up and down. Specifically, as shown in FIGS. 13 and 14, the operation portion exposure window 1111 is formed in the shape of a rectangular opening that communicates with the inside of the housing case 111 from the outside of the housing case 111. Further, as shown in FIGS. 13 and 14, the hook portion exposure window 1112 is formed at the upper portion of the housing case 111 so that the above-mentioned hook portion 148 can protrude from and retreat into the hook portion exposure window 1112. The hook portion exposure window 1112 is formed in the shape of a U-shaped opening that communicates with the inside of the housing case 111 from the outside of the housing case 111. Here, the operation portion exposure window 1111 and the hook portion exposure window 1112, which have the shapes of communication openings, correspond to the communication opening according to the invention. For this reason, the peripheral portions of the arrangement portions of the operation portion exposure window 1111 and the hook portion exposure window 1112 correspond to the vicinity of the communication opening according to the invention.

The biasing coil spring 149 is a coil spring that is widely used. The lower end of the biasing coil spring 149 comes into contact with the inner surface of the base member 141, and the upper end of the biasing coil spring 149 comes into contact with the lower portion of the male hook body 145. Accordingly, the biasing coil spring 149 biases the male hook body 145 upward. In this way, the male hook mechanism 140 in the normal state urges the hook portion 148 of the male hook body 145 to protrude from the hook portion exposure window 1112 by the biasing force of the biasing coil spring 149. That is, the hook portion can be fitted to a female hook portion (not shown) that is provided on the tool body. On the other hand, when the operation portion 147 exposed to the outside through the operation portion exposure window 1111 is moved downward against the biasing force of the biasing coil spring 149, the hook portion 148 of the male hook body 145 protruding from the hook portion exposure window 1112 retreats. That is, it is possible to release the fitting between the hook portion 148 and the female hook portion (not shown).

Here, a stepped guide portion 150 is provided on the housing case 111 at a position on the upper side of the portion where the operation portion exposure window 1111 is arranged. The stepped guide portion 150 is formed in a convex shape that separates the water, which is present at the peripheral portion of the arrangement portion of the hook portion exposure window 1112, from the hook portion exposure window 1112. As shown in FIGS. 13 and 14, the stepped guide portion 150 is formed so that the water, which is present on the outer surface of the housing case 111, flows along the outer surface of the housing case 111 without reaching the hook portion exposure window 1112. Specifically, as shown in FIGS. 13 and 14, a stepped portion protruding outward in a shape of a mountain with its upper side being convex, is formed at the stepped guide portion 150. The mountain-shaped stepped portion of the stepped guide portion 150 is formed so that a mountain-shaped peak portion (reference numeral 151) is positioned above the portion where the operation portion exposure window 1111 is arranged and both mountain-shaped bases (reference numeral 152) are positioned on both left and right sides of the portion where the operation portion exposure window 1111 is arranged. Meanwhile, the protruding height of the stepped guide portion 150, which is a difference in level, is set so as to be reduced from the mountain-shaped peak portion (reference numeral 151) toward both the mountain-shaped bases (reference numeral 152). The mountain-shaped stepped portion of the stepped guide portion 150 forms the water-introduction restricting portion according to the invention. That is, the stepped guide portion 150 guides the movement of water so as to restrict the introduction of water into the operation portion exposure window 1111 when water is splashed on the battery pack 110 or the like.

Meanwhile, since the above-mentioned base member 141 is configured so as to have a structure for isolating the housing case 111 and the internal installation body 121 from each other, it is possible to restrict the intrusion of the water, which is introduced into the housing case 111, into the internal installation body 121 by the base member 141 even in the case that water has been introduced into the housing case 111 from the operation portion exposure window 1111 and the hook portion exposure window 1112.

According to the above-mentioned battery pack 110, it is possible to obtain the following functions and effects.

That is, according to the above-mentioned battery pack 110, opening shapes are formed in order to arrange the electrical connection portions 134 and the male hook mechanism 140. Here, the stepped guide portion 150 and the upper surface 117 of the above-mentioned battery pack 110 as the water-introduction restricting portion, which is provided on the housing case 111, act so as to restrict the introduction of the water, which is splashed from the outside, into the opening shapes. Accordingly, it is possible to improve the waterproof property of the battery pack 110 by restricting the intrusion of water into the housing case 111 from the outside of the housing case 111.

Further, according to the above-mentioned battery pack 110, the inclined structure of the upper surface 117 of the battery pack 110 is provided on the front side of the portions where the battery-side connection terminals 136 (the connection terminal 1361 of the positive connection portion 1341, the connection terminal 1362 of the negative connection portion 1342, and the connection terminal 1363 of the control connection portion 1343) are arranged. Accordingly, it is possible to make the water, which is present in the periphery of the portions where the battery-side connection terminals 136 are arranged, to flow in the direction away from the portions where the battery-side connection terminals 136 are arranged, by the inclined structure. Therefore, since it is possible to separate the water, which is present on the upper surface 117 of the battery pack 110, from the portions where the battery-side connection terminals 136 are arranged, it is possible to improve the waterproof property of the battery pack 110 by restricting the introduction of water into the housing case 111 from the outside of the housing case 111. Accordingly, it is possible to make the contact between water such as raindrops and the battery-side connection terminals 136 more difficult.

Furthermore, according to the above-mentioned battery pack 110, since the water-introduction restricting portion is formed in the uneven shape that isolates the water, which is present in the vicinity of the communication opening, from the communication opening, it is possible to separate the water, which is present in the vicinity of the communication opening, from the communication opening. Accordingly, it is possible to restrict the introduction of water into the housing case 111 from the outside of the housing case 111 by separating water from the communication opening, so that it is possible to improve the waterproof property of the battery pack 110.

Moreover, according to the above-mentioned battery pack 110, the stepped guide portion 150 is provided on the housing case 111 on the upper side of the operation portion exposure window 1111, which is a portion where the male hook mechanism 140 as a male hook portion is arranged. Due to the stepped convex shape of the stepped guide portion 150, it is possible to isolate the water, which is present in the periphery of the operation portion exposure window 1111, from the operation portion exposure window 1111. Accordingly, it is possible to restrict the introduction of water into the housing case 111 from the outside of the housing case 111 by isolating water from the operation portion exposure window 1111, so that it is possible to improve the waterproof property of the battery pack 110.

Further, according to the above-mentioned battery pack 110, the stepped portions 137 are formed at the boundary portions between the electrical connection portions 134 (the positive connection portion 1341, the negative connection portion 1342, and the control connection portion 1343) and the upper surface 117 of the battery pack 110 positioned on the front side of the electrical connection portions 134. Accordingly, due to the stepped convex shape, it is possible to isolate the water, which is present in the periphery of the electrical connection portions 134, from the electrical connection portions 134. Therefore, it is possible to restrict the introduction of water into the housing case 111 from the outside of the housing case 111 by isolating water from the electrical connection portions 134, so that it is possible to improve the waterproof property of the battery pack 110.

Fourth Embodiment

Next, the fourth embodiment, which embodies the battery pack according to the invention, will be described with reference to FIG. 18 and its subsequent figures. Meanwhile, a battery pack 160 of the fourth embodiment is an embodiment where vent holes 171 and 181 are formed in the structure of the battery pack 110 of the above-mentioned third embodiment. That is, the battery pack 160 of the fourth embodiment has substantially the same structure as the structure of the battery pack 110 of the third embodiment. For this reason, the same portions of the battery pack 160 of the fourth embodiment as the portions of the battery pack 110 of the above-mentioned third embodiment are denoted by the reference numerals having been used in the description of the battery pack 110 of the third embodiment, and the description thereof will be omitted. Meanwhile, the structure of a male hook mechanism 140A of the battery pack 160 of the fourth embodiment is slightly different from that of the male hook mechanism 140 of the battery pack 110 of the third embodiment. That is, the male hook mechanism 140A of the fourth embodiment is different from the male hook mechanism 140 of the third embodiment in terms of the structure of the biasing coil spring 149, and other structures of the fourth embodiment are the same as those of the third embodiment. For this reason, portions of the male hook mechanism 140A of the fourth embodiment are denoted by reference numerals having "A" at the ends thereof, and the description thereof will be omitted.

Figure 18:
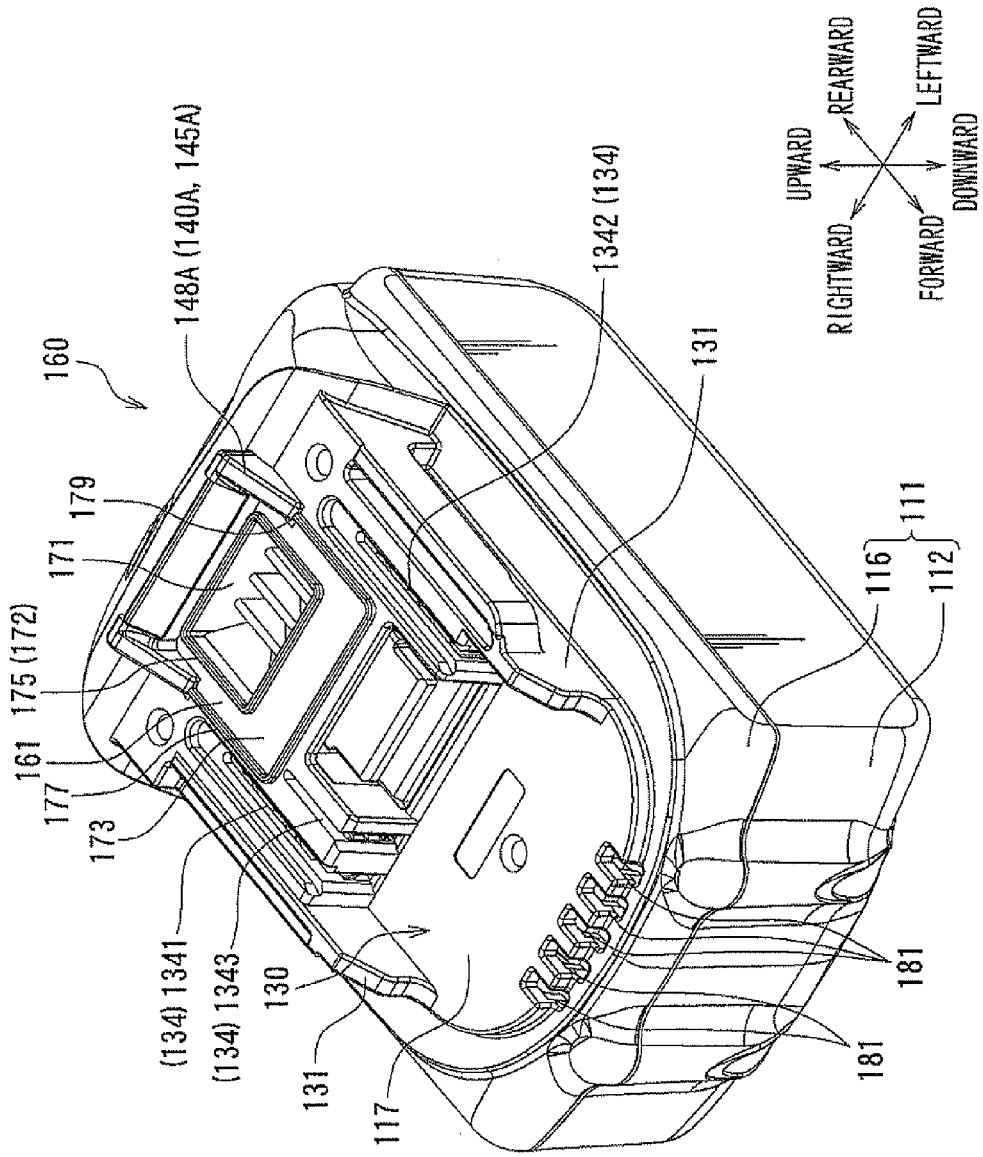
FIG. 18 is a perspective view of the appearance of a battery pack of a fourth embodiment that is embodied in the second example.
Figure 19:
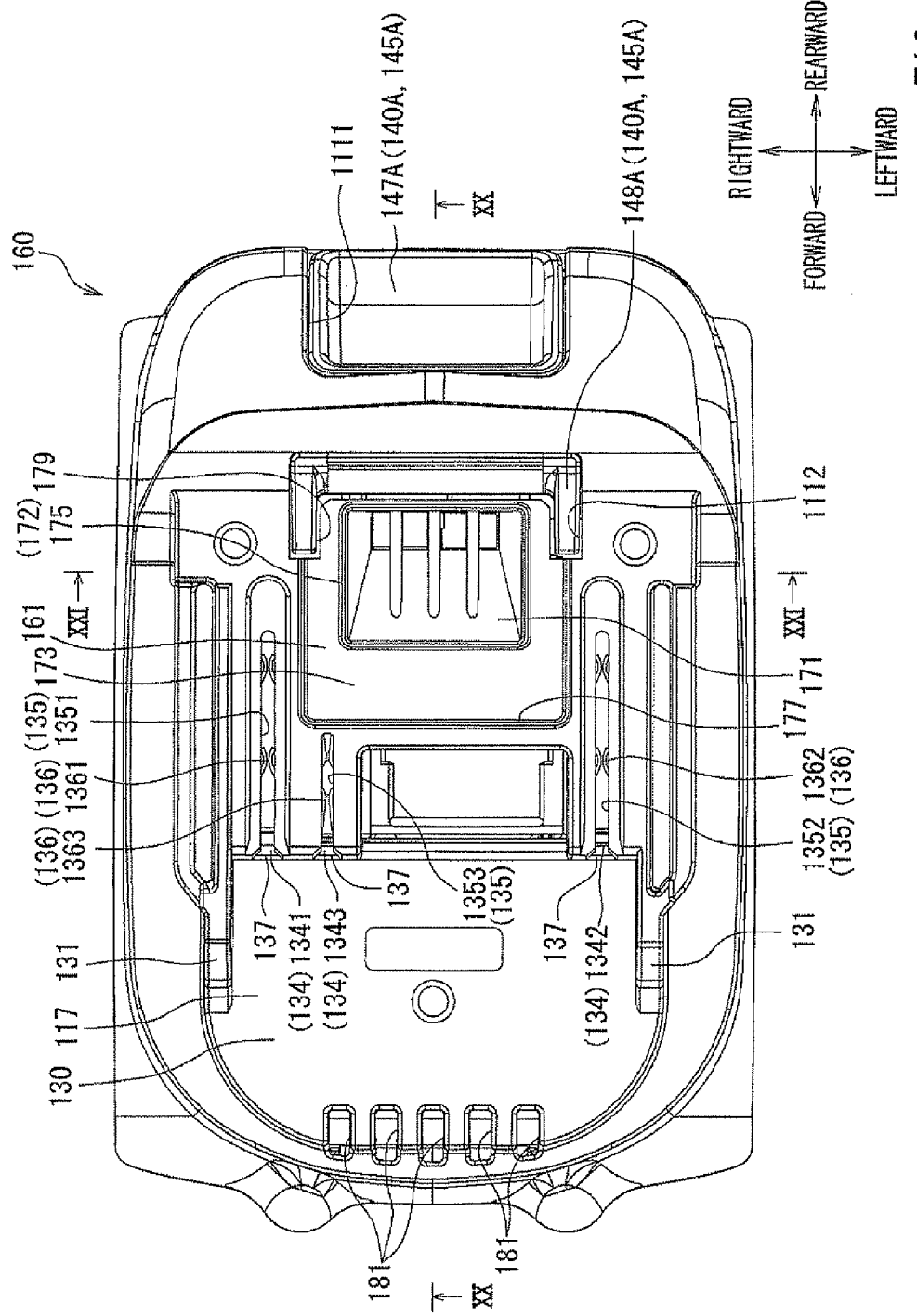
FIG. 19 is a top view of the battery pack of FIG. 18.
Figure 20:
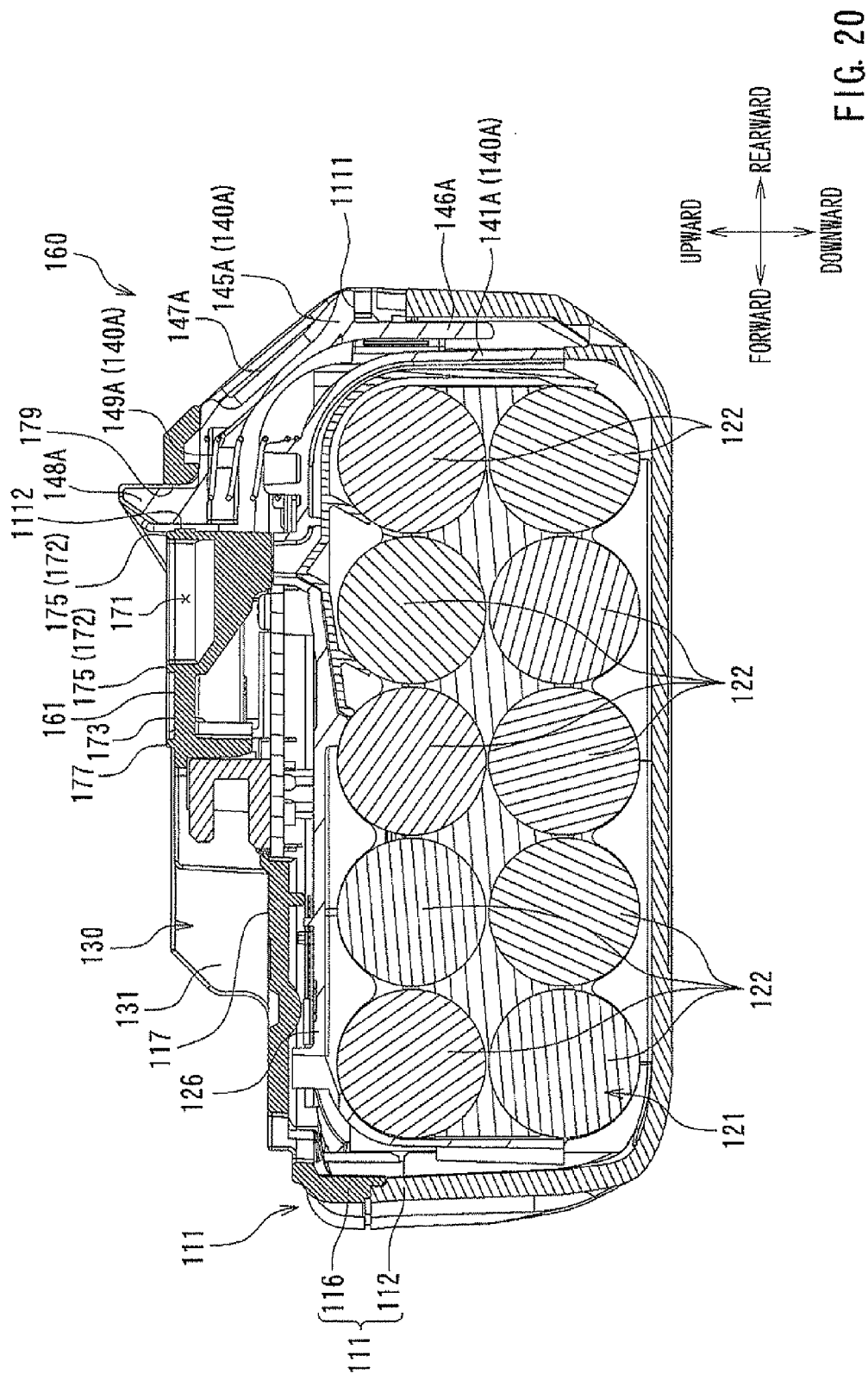
FIG. 20 is a cross-sectional view taken along line XX-XX in FIG. 19.
Figure 21:
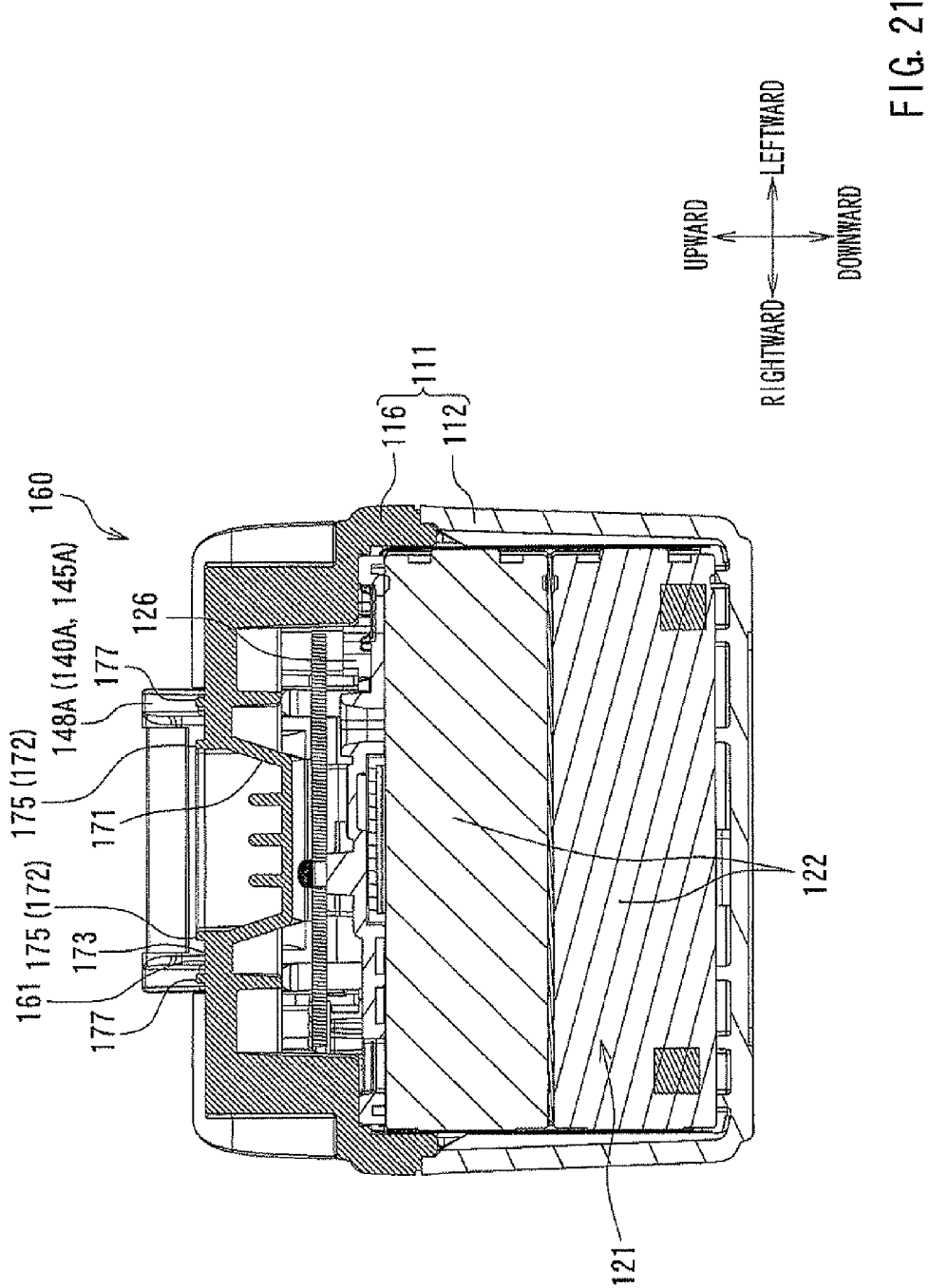
FIG. 21 is a cross-sectional view taken along line XXI-XXI in FIG. 19.

FIG. 18 shows the appearance of the battery pack 160, which is the fourth embodiment, in perspective. FIG. 19 shows the battery pack 160 that is seen from above. FIG. 20 shows the cross-section of the internal structure of the battery pack 160 taken along line XX-XX in FIG. 19. FIG. 21 shows the cross-section of the internal structure of the battery pack 160 taken along line XXI-XXI in FIG. 19. Meanwhile, in the following description, the electrical connection side of the battery pack 160 is defined as the upper side and the slide mounting direction of the battery pack 160 is defined as a front side.

Two vent holes 171 and 181 having appropriate opening shapes are formed in an upper surface 161 of the battery pack 160 shown in FIGS. 18 to 21. That is, reference numeral 171 denotes an intake-side vent hole. The intake-side vent hole 171 is adapted to send cooling air, which has been sent from a dedicated charger or the like, toward an internal installation body 121 that is disposed in a housing case 111. Further, reference numeral 181 denotes an exhaust-side vent hole. The exhaust-side vent hole 181 is adapted to discharge the cooling air that has been sent to the internal installation body 121 and passed through the internal installation body 121. These vent holes 171 and 181 allow the temperature of the internal installation body 121 (battery cells 122 and a control board 126) to be lowered by cooling air and allow the time, which is required until the battery pack 160 is fully charged, to be shortened. In detail, during charging the battery pack 160 by a dedicated charger, the temperature of the internal installation body 121 (the battery cells 122 and the control board 126) rises due to the charge of the battery pack 160. However, since the temperature of the internal installation body 121 can be lowered by the cooling air sent from the vent holes 171 and 181, a charge effect is improved. As a result, the time, which is required until the battery pack 160 is fully charged, is shortened. That is, the cooling air, which is sent from a dedicated charger or the like, is introduced into the housing case 111 from the intake-side vent hole 171, cools the internal installation body 121, and is discharged to the outside of the housing case 111 from the exhaust-side vent hole 181. Meanwhile, the exhaust-side vent hole 181 is formed in a shape that is merely opened, unlike the intake-side vent hole 171 that will be described in detail below.

As shown in FIGS. 18 to 21, the two vent holes 171 and 181 are formed on the upper surface 161 of the battery pack 160 at two portions, that is, rear and front portions of the battery pack 160. That is, the intake-side vent hole 171 is formed at the rear portion of the upper surface 161 of the battery pack 160. The intake-side vent hole 171 is formed on the upper surface 161 of the battery pack 160 that is present between the male hook mechanism 140A and the electrical connection portions 134 (a positive connection portion 1341, a negative connection portion 1342, and a control connection portion 1343). As also shown in FIG. 18, the intake-side vent hole 171 is formed in a shape of an opening in the upper surface 161 of the battery pack 160 so that air can be introduced into the housing case 111 from the outside of the housing case 111. For this reason, the intake-side vent hole 171 corresponds to the communication opening according to the invention. Further, the periphery of the portion where the intake-side vent hole 171 is arranged corresponds to the vicinity of the communication opening according to the invention. Specifically, a peripheral edge 172 of the intake-side vent hole 171 and a periphery 173 of the peripheral edge 172 are set as the periphery of the portion where the intake-side vent hole 171 is arranged. Here, a first convex rib 175, which protrudes upward, is formed at the peripheral edge 172 of the intake-side vent hole 171. The first convex rib 175 protrudes upward so as to be higher than the periphery 173 of the intake-side vent hole 171 that forms the upper surfaces of the electrical connection portions 134. For this reason, due to the convex shape of the first convex rib 175, it is possible to isolate the water, which is present in the periphery 173 of the portion where the intake-side vent hole 171 is arranged, from the portion where the intake-side vent hole 171 is arranged. Accordingly, it is possible to improve the waterproof property of the battery pack 160 by restricting the intrusion of water into the housing case 111 from the intake-side vent hole 171.

Moreover, second convex ribs 177 are formed at the boundary portions between the periphery 173 of the portion where the above-mentioned intake-side vent hole 171 is arranged and the above-mentioned electrical connection portions 134 (the positive connection portion 1341, the negative connection portion 1342, and the control connection portion 1343). Like the above-mentioned first convex rib 175, the second convex ribs 177 protrude upward so as to be higher than the periphery 173 of the intake-side vent hole 171 that forms the upper surfaces of the electrical connection portions 134. For this reason, due to the convex shape of the second convex ribs 177, it is possible to isolate the water, which is present in the vicinity 173 of the portions where the electrical connection portions 134 are arranged, from the portions where the electrical connection portions 134 are arranged. Accordingly, it is possible to improve the waterproof property of the battery pack 160 by restricting the intrusion of water into the housing case 111 from the electrical connection portions 134.

Meanwhile, the battery pack according to the invention is not limited to the above-mentioned embodiments, and appropriate portions of the battery pack may be modified as described below.

That is, the electrical connection portions 134 (the positive connection portion 1341, the negative connection portion 1342, and the control connection portion 1343), the operation portion exposure window 1111, the hook portion exposure window 1112, and the intake-side vent hole 171 have been exemplified as the communication opening of the above-mentioned embodiment. However, the communication opening according to the invention is not limited to the above-mentioned embodiment, and any construction allowing communication with the inside of the housing case from the outside of the housing case may correspond to the communication opening according to the invention. Further, the water-introduction regulating portion according to the invention is also not limited to the above-mentioned embodiment, and any construction restricting the introduction of the water, which is present in the vicinity of the communication opening, into the communication opening may correspond to the water-introduction regulating portion according to the invention. That is, the water-introduction regulating portion according to the invention may be the inclined structure that makes the water, which is present in the vicinity of the communication opening, flow in the direction away from the communication opening. Alternatively, it can be any structure that is formed in an uneven shape for isolating water present in the vicinity of the communication opening from the communication opening. Furthermore, the "uneven shape" is not limited to, for example, the above-mentioned convex ribs 175 and 177 having the shape of protrusions, but may include a convex wall structure having convex ribs, a concave groove structure, and/or an appropriate uneven step shaped structure.

Meanwhile, the battery pack 160 of the above-mentioned fourth embodiment may be positively provided with a water release passage as will be described below. That is, the periphery 173 of the portion where the intake-side vent hole 171 is arranged is isolated due to the convex shapes of the above-mentioned first and second convex ribs 175 and 177, and therefore, water is apt to be collected due to these convex shapes. For this reason, a water release passage may be formed to allow release of water collected in the vicinity 173 of the portion where the intake-side vent hole 171 is arranged due to these convex shapes escapes. A structure having an appropriate shape may be proposed as the water release passage, but, for example, the following structure may be used as the water release passage. That is, the hook clearance 179 formed between the hook portion exposure window 1112 and the hook portion 148A of the male hook body 145A described in the above-mentioned third embodiment may be configured as an inlet of the water release passage, and the above-mentioned operation portion exposure window 1111 may be configured as an outlet of the water release passage. If the hook clearance 179 is configured as the inlet of the water release passage as described above, water is temporarily introduced into the housing case 111, flows along the base member 141A, and is discharged to the outside of the housing case 111 from the operation portion exposure window 1111. Meanwhile, since the base member 141A isolates the housing case 111 and the internal installation body 121 from each other as described above, water that has been temporarily introduced into the housing case 111 may not reach the internal installation body 121. That is, it is possible to allow water to flow along the base member 141A and to be discharged to the outside of the housing case 111 from the operation portion exposure window 1111. Meanwhile, other than using the operation portion exposure window 1111, the outlet of the water release passage may be appropriately formed. For example, a case communication hole, which is formed at the housing case 111 near the lower end of the base member 141A and communicates the inside of the housing case 111 with the outside of the housing case 111 in a vertical direction, may be formed as the outlet of the water release passage. If the outlet of the water release passage is formed to allow for communication between the inside of the housing case 111 and the outside of the housing case 111 in the vertical direction as described above, water is easily discharged to the outside of the housing case 111 from the lower portion of the housing case 111.

DESCRIPTION OF REFERENCE NUMERALS

10, 10A: battery pack
20: housing case
201: support lower surface
21, 21B: case body
211: bottom wall portion
212: side wall portion
221: outer surface
222: inner surface
223: bottom surface
23: rib
231: support rib
232: air guide rib
233: foreign material-introduction restricting rib
25, 25A, 25B: drain hole (drainage function-shape portion)
261: outer end edge
262: inner end edge
27, 27B: drain passage (drainage function-shape portion, flow guide means)
28: drawing groove (drainage function-shape portion, draw guide means)
31: upper cover member
32: slide guide portion
33: connection opening
34: hook-exposure opening
35: air vent opening
39: screw member
40: battery pack body
41: battery cell
42: electrode
45: lead plate
46 (461, 462, 463): left lead plate
47 (471, 472, 473): right lead plate
51: connection control board
52: control board
53: connection terminal portion
55: male hook mechanism
56: hook-type structure
C: clearance
F: placement surface

The invention claimed is:

1. A battery pack configured to be able to be mounted on a tool body of an electric tool as a power source of the electric tool, the battery pack comprising:
a housing case configured as an outer cover, the housing having a first side wall and a second side wall, the second side wall extending substantially in parallel with the first side wall;
a plurality of battery cells disposed in the housing case, the plurality of battery cells being disposed such that longitudinal axes of the plurality of battery cells extend substantially parallel to each other from a side of the first side wall toward a side of the second side wall,
a drainage device provided at a bottom portion of the housing case and having a drain hole communicating between an inside and an outside of the housing case, the drainage device being configured to discharge water introduced into the housing case to the outside of the housing case through the drain hole, and a first terminal member and a second terminal member each connected to at least one of electrodes of the plurality of battery cells, both the first terminal member and the second terminal member being disposed adjacent to the first side wall and along the first side wall so that the first terminal member and the second terminal member face the first side wall, wherein the drainage device is disposed at least between the first terminal member and the second terminal member.

2. The battery pack according to claim 1,
wherein the plurality of battery cells are arranged in parallel to each other so that the electrodes are arranged adjacent to each other in an arrangement direction,
the first and the second terminal members are arranged adjacent to each other along the arrangement direction and have electrical potentials different from each other.

3. The battery pack according to claim 1,
wherein the drain hole has an outer end edge disposed on an outer side of the housing case and formed to have a shape so that the outer end edge rises toward the inside of the housing case as compared to at least a peripheral portion of the outer end edge.

4. The battery pack according to claim 1,
wherein the drainage device further includes a flow guide device for guiding the flow of water so that water flows toward the drain hole, and
the flow guide device comprises a drain passage inclined downward toward the drain hole.

5. The battery pack according to claim 1,
wherein the drainage device further includes a draw guide device for drawing water into the drain hole, and
the draw guide device comprises a drawing groove configured as a concave groove and extending along an inner surface of the housing case from an inner end edge of the drain hole disposed on an inner side of the housing case, so that water is drawn toward the drain hole along the concave groove.

6. The battery pack according to claim 1,
wherein the housing case includes a foreign material-introduction restricting rib extending across the drain hole without completely closing the drain hole.

7. The battery pack according to claim 4,
wherein the drain hole is disposed at a position between the first and second terminal members, and
the flow guide device is disposed at a position that is different from the position between the first and second terminal members.

8. The battery pack according to claim 5,
wherein the drain hole is disposed at a position between the first and second terminal members, and
the draw guide device is disposed at a position that is different from the position between the first and second terminal members.

9. The battery pack according to claim 4,
wherein at least a part of the flow guide device is positioned between the first and second terminal members, and the drain hole is disposed at a position that is different from the position between the first and second terminal members.

10. The battery pack according to claim 5,
wherein at least a part of the draw guide device is positioned between the first and second terminal members, and
the drain hole is disposed at a position that is different from the position between the first and second terminal members.

11. The battery pack according to claim 1,
wherein the housing case includes a communication opening communicating between the inside and the outside of the housing case, and
the housing case further includes a water-introduction restricting portion that restricts water, which is present in the vicinity of the communication opening, from flowing into the communication opening.

12. The battery pack according to claim 11,
wherein the water-introduction restricting portion is inclined so that water, which is present in the vicinity of the communication opening, flows in a direction away from the communication opening.

13. The battery pack according to claim 10, further comprising:
a battery-side connection terminal that is electrically connected to a connection terminal provided on a mounting target when the battery pack is mounted on the mounting target,
wherein the battery-side connection terminal is disposed at a position proximal to the communication opening; and
wherein the water-introduction restricting portion is disposed proximal to the battery-side connection terminal.

14. The battery pack according to claim 11,
wherein the water-introduction restricting portion is formed to have an uneven shape that isolates the water present in the vicinity of the communication opening, from the communication opening.

15. The battery pack according to claim 14, further comprising:
a male hook portion configured to be fitted to a female hook portion provided on a mounting target when the battery pack is mounted on the mounting target,
wherein the male hook portion is disposed at a position proximal to the communication opening, and
the water-introduction restricting portion is disposed proximal to the male hook portion.

16. The battery pack according to claim 14, wherein:
the housing case includes a vent hole through which air flows into the housing case from the outside of the housing case,
the vent hole is disposed at a position proximal to the communication opening, and
the water-introduction restricting portion is disposed proximal to the vent hole.

* * * * *